US011921441B2

(12) United States Patent
Murakami et al.

(10) Patent No.: US 11,921,441 B2
(45) Date of Patent: Mar. 5, 2024

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Katsuya Murakami, Toride (JP); Ayatomo Okino, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/093,857

(22) Filed: Jan. 6, 2023

(65) Prior Publication Data

US 2023/0144789 A1 May 11, 2023

Related U.S. Application Data

(60) Division of application No. 17/500,007, filed on Oct. 13, 2021, now Pat. No. 11,592,765, which is a division of application No. 16/862,747, filed on Apr. 30, 2020, now Pat. No. 11,181,851, which is a continuation of application No. 16/351,824, filed on Mar. 13, 2019, now Pat. No. 10,678,165, which is a continuation of application No. PCT/JP2018/036620, filed on Sep. 21, 2018.

(30) Foreign Application Priority Data

Sep. 21, 2017 (JP) ................................ 2017-181799

(51) Int. Cl.
*G03G 15/08* (2006.01)
*G03G 21/16* (2006.01)

(52) U.S. Cl.
CPC ..... *G03G 15/0886* (2013.01); *G03G 15/0867* (2013.01); *G03G 15/0874* (2013.01); *G03G 21/1647* (2013.01); *G03G 21/1676* (2013.01)

(58) Field of Classification Search
CPC .......... G03G 15/0867; G03G 15/0874; G03G 15/0886; G03G 21/1647; G03G 21/1676; G03G 2215/0692; G03G 2221/163
See application file for complete search history.

(56) References Cited

U.S. PATENT DOCUMENTS 6,049,685 A 4/2000 Murakami et al.
6,128,453 A 10/2000 Ban et al.
6,278,853 B1 8/2001 Ban et al.
(Continued)

FOREIGN PATENT DOCUMENTS

CN 1267843 A 9/2000
CN 204536730 U 8/2015
(Continued)

OTHER PUBLICATIONS

Jan. 9, 2023 Office Action in Korean Patent Application No. 10-2022-7039240 (with English translation).
(Continued)

*Primary Examiner* — Sophia S Chen
(74) *Attorney, Agent, or Firm* — Venable LLP

(57) ABSTRACT

A developer supply container includes a developer discharging portion that is provided with a discharge passageway. A track is provided at a first side of the developer discharging portion. A shutter is provided with a shutter opening configured to permit discharge of the developer from the discharge passageway, with the shutter including a recessed portion on an outer side of the shutter. The recessed portion includes an inclined surface.

4 Claims, 21 Drawing Sheets

(56) References Cited

U.S. PATENT DOCUMENTS

| | | | |
|---|---|---|---|
| 6,314,261 | B1 | 11/2001 | Omata et al. |
| RE38,737 | E | 5/2005 | Ban et al. |
| 7,050,728 | B2 | 5/2006 | Minagawa et al. |
| 7,242,893 | B2 | 7/2007 | Murakami et al. |
| 7,548,710 | B2 | 6/2009 | Gayne et al. |
| 7,738,818 | B2 | 6/2010 | Murakami et al. |
| 8,000,614 | B2 | 8/2011 | Okino et al. |
| 9,229,364 | B2 | 1/2016 | Murakami et al. |
| 9,348,261 | B2 | 5/2016 | Enokuchi et al. |
| 9,354,549 | B1 | 5/2016 | Okino et al. |
| 9,383,686 | B2 | 7/2016 | Murakami et al. |
| 9,529,299 | B2 | 12/2016 | Okino et al. |
| 9,535,369 | B2 | 1/2017 | Kamura et al. |
| 9,588,461 | B2 | 3/2017 | Kamura et al. |
| 9,720,349 | B2 | 8/2017 | Yamaoka et al. |
| 9,811,024 | B2 | 11/2017 | Yomoda et al. |
| 10,088,773 | B2 | 10/2018 | Yamaoka et al. |
| 10,088,775 | B2 | 10/2018 | Kamura et al. |
| 2007/0280743 | A1 | 12/2007 | Nakajima et al. |
| 2008/0101821 | A1 | 5/2008 | Gayne et al. |
| 2009/0185824 | A1 | 7/2009 | Murakami et al. |
| 2009/0214269 | A1 | 11/2009 | Choi et al. |
| 2010/0129119 | A1 | 5/2010 | Nagashima et al. |
| 2010/0209141 | A1 | 8/2010 | Ikado |
| 2012/0014722 | A1 | 1/2012 | Okino et al. |
| 2012/0125944 | A1 | 5/2012 | Okuma et al. |
| 2012/0222776 | A1 | 9/2012 | Sakamoto et al. |
| 2014/0153974 | A1 | 6/2014 | Jimba et al. |
| 2015/0043944 | A1 | 2/2015 | Yamamoto |
| 2015/0248102 | A1 | 9/2015 | Nakajima |
| 2016/0004186 | A1 | 1/2016 | Jimba et al. |
| 2016/0223981 | A1 | 8/2016 | Enokuchi et al. |
| 2017/0060027 | A1 | 3/2017 | Yomoda et al. |
| 2017/0242367 | A1 | 8/2017 | Jimba et al. |
| 2017/0351212 | A1 | 12/2017 | Enokuchi et al. |
| 2018/0024465 | A1 | 1/2018 | Yomoda et al. |
| 2019/0018340 | A1 | 1/2019 | Yamaoka et al. |
| 2019/0018341 | A1 | 1/2019 | Yamaoka et al. |
| 2019/0204778 | A1 | 7/2019 | Gamo et al. |
| 2019/0212672 | A1 | 7/2019 | Gamo et al. |
| 2019/0212693 | A1 | 7/2019 | Okinio et al. |
| 2019/0212694 | A1 | 7/2019 | Katayama et al. |

FOREIGN PATENT DOCUMENTS

| | | | |
|---|---|---|---|
| CN | 106019897 | A | 10/2016 |
| JP | H11-295983 | A | 10/1999 |
| JP | 2010-191016 | A | 9/2010 |
| JP | 2011-070236 | A | 4/2011 |
| JP | 2012-150319 | A | 8/2012 |
| JP | 2013-015826 | A | 1/2013 |
| JP | 2013-156587 | A | 8/2013 |
| KR | 10-2009-0015984 | A | 2/2009 |
| KR | 10-0912900 | A | 8/2009 |
| KR | 2010-256894 | A | 11/2010 |
| KR | 10-2010-0132084 | A | 12/2010 |
| KR | 10-2014-0041599 | A | 4/2014 |
| KR | 2015-0020088 | A | 2/2015 |
| KR | 2015-0102689 | A | 9/2015 |
| KR | 10-2017-0026145 | A | 3/2017 |
| RU | 2 419 120 | C2 | 5/2011 |
| RU | 2 628 667 | C2 | 8/2017 |
| WO | 2012/169659 | A1 | 12/2012 |

OTHER PUBLICATIONS

International Search Report and Written Opinion for International Patent Application No. PCT/JP2018/036620, dated Nov. 13, 2018.

Aug. 18, 2020 Office Action in Australian Patent Application No. 2018335799.

Oct. 15, 2020 Decision to Grant in Russian Patent Application No. 2020113693 (with English translation).

Nov. 10, 2020 Office Action in Eurasian Patent Application No. 202090779 (with English translation).

Dec. 15, 2020 Office Action in Korean Patent Application No. 10-2020-7010137.

May 28, 2021 Communication in European Patent Application No. 18 859 824.7.

May 27, 2021 Office Action in Canadian Patent Application No. 3,076,603.

May 26, 2021 Decision to Grant in Russian Patent Application No. 2020141242 (with English translation).

Jun. 15, 2021 Examination Report in Indian Patent Application No. 202047015873.

Jun. 29, 2021 Office Action in Japanese Patent Application No. 2017-181799 (with English translation).

Aug. 9, 2021 Office Action in German Patent Patent Application No. 11 2018 004 236.7 (with English translation).

Aug. 26, 2021 Notice of Allowance in Korean Patent Application No. 10-2020-7010137.

Dec. 28, 2021 Office Action in Chinese Patent Application No. 201880060173.9 (with English translation).

Apr. 12, 2022 Office Action in Eurasian Patent Application No. 202193077 (with English translation).

Aug. 9, 2022 Notice of Allowance in Korean Patent Application No. 10-2021-7038733.

Aug. 23, 2022 Office Action in Australian Patent Application No. 2021212119.

Nov. 10, 2022 Communiation in European Patent Application No. 22 179 543.8.

(a)

(b)

(a)

(b)

(a)

(b)

(a)

(b)

(a)

(b)

(a)

(b)

(a)

(b)

(c)

DEVELOPER SUPPLY CONTAINER AND DEVELOPER SUPPLYING SYSTEM

TECHNICAL FIELD

The present invention relates to a developer supply container dismountably mountable to a developer receiving apparatus and a developer supplying system.

BACKGROUND ART

Conventionally, in electrophotographic image forming apparatuses such as copying machines, fine developing powder such as toner has been used. In such an image forming apparatus, the developer consumed by the image formation is supplemented from a developer supply container.

For example, a structure has been proposed in which the developer supply container is mountable to and dismountable from a developer receiving apparatus provided in the image forming apparatus, and the developer receiving portion of the developer receiving apparatus is displaced toward the discharge opening of the developer supply container in accordance with the mounting operation of the developer supply container (JP2013-015826A).

SUMMARY OF THE INVENTION

Problems to be Solved by Invention

It is an object of the present invention to provide a structure further improved in the structure described in the above-mentioned Japanese Patent Application Laid-open No. 2013-015826.

Means for Solving the Problem

According to one aspect of the present invention, there is provided a developer supply container detachably mountable to a developer receiving apparatus, said developer receiving apparatus including a developer receiving portion provided with a receiving port for receiving a developer and including a portion-to-be-engaged capable of displacing integrally with said developer receiving portion, said developer supply container comprising a rotatable developer accommodating portion for accommodating the developer; a developer discharging portion which is rotatable relative to said developer accommodating portion and which is provided at a bottom side thereof with a discharge opening for discharging the developer accommodated in said developer accommodating portion; and an engaging portion provided only on one side of said developer discharging portion as seen in a direction in which said developer supply container is inserted into the developer receiving apparatus, said engaging portion is engageable with the portion-to-be-engaged with a mounting operation of said developer supply container to displace the developer receiving portion to move said developer receiving portion toward said discharge opening, thereby to bring the receiving port into fluid communication with said discharge opening.

Effect of the Invention

According to the present invention, a further improved structure can be provided.

Figure 3:
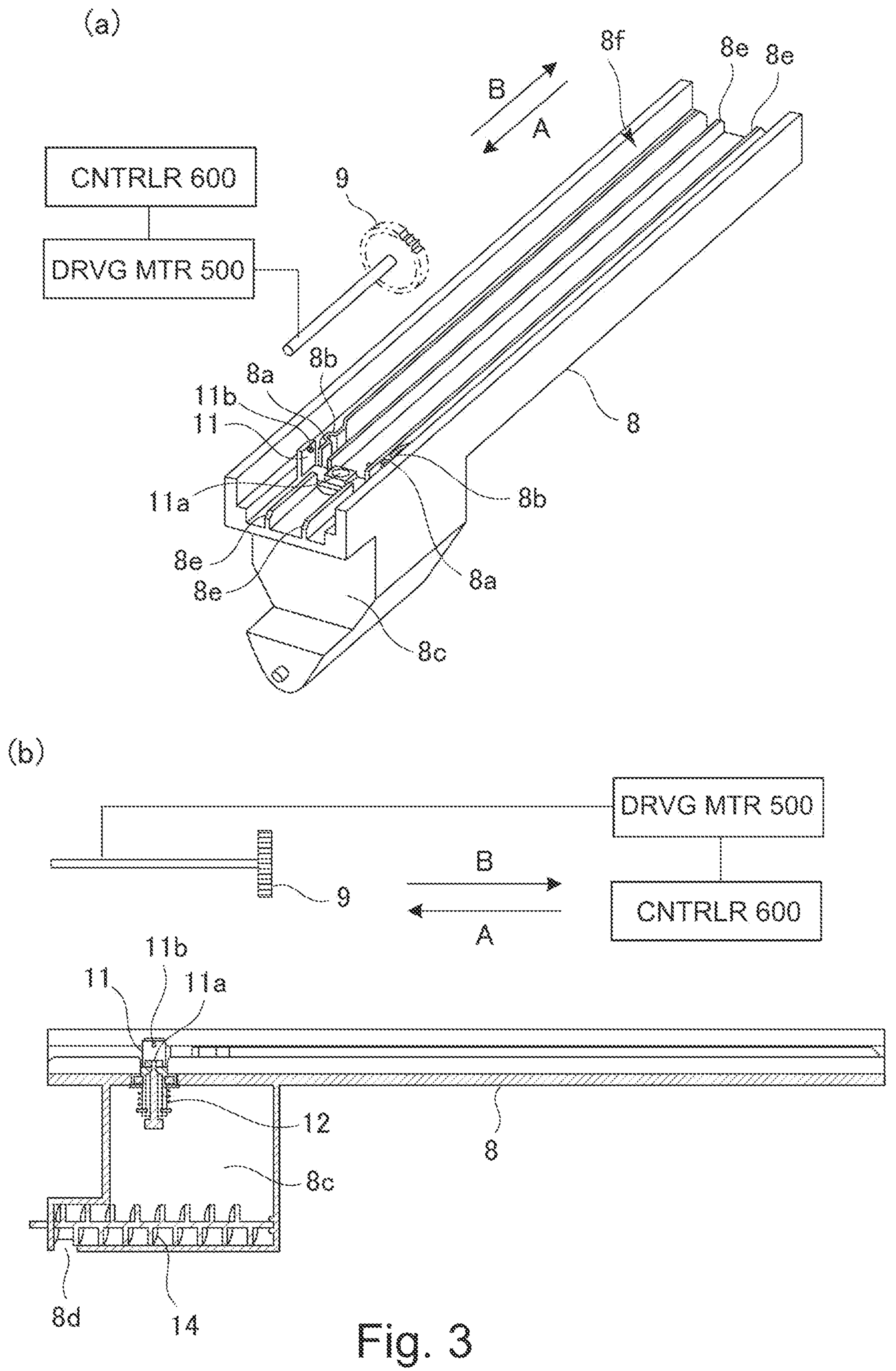

Parts (a) and (b) of FIG. 3 show a developer receiving apparatus according to the Embodiment, in which part (a) is a perspective view thereof, and part (b) is a cross-sectional view thereof.

Figure 4:
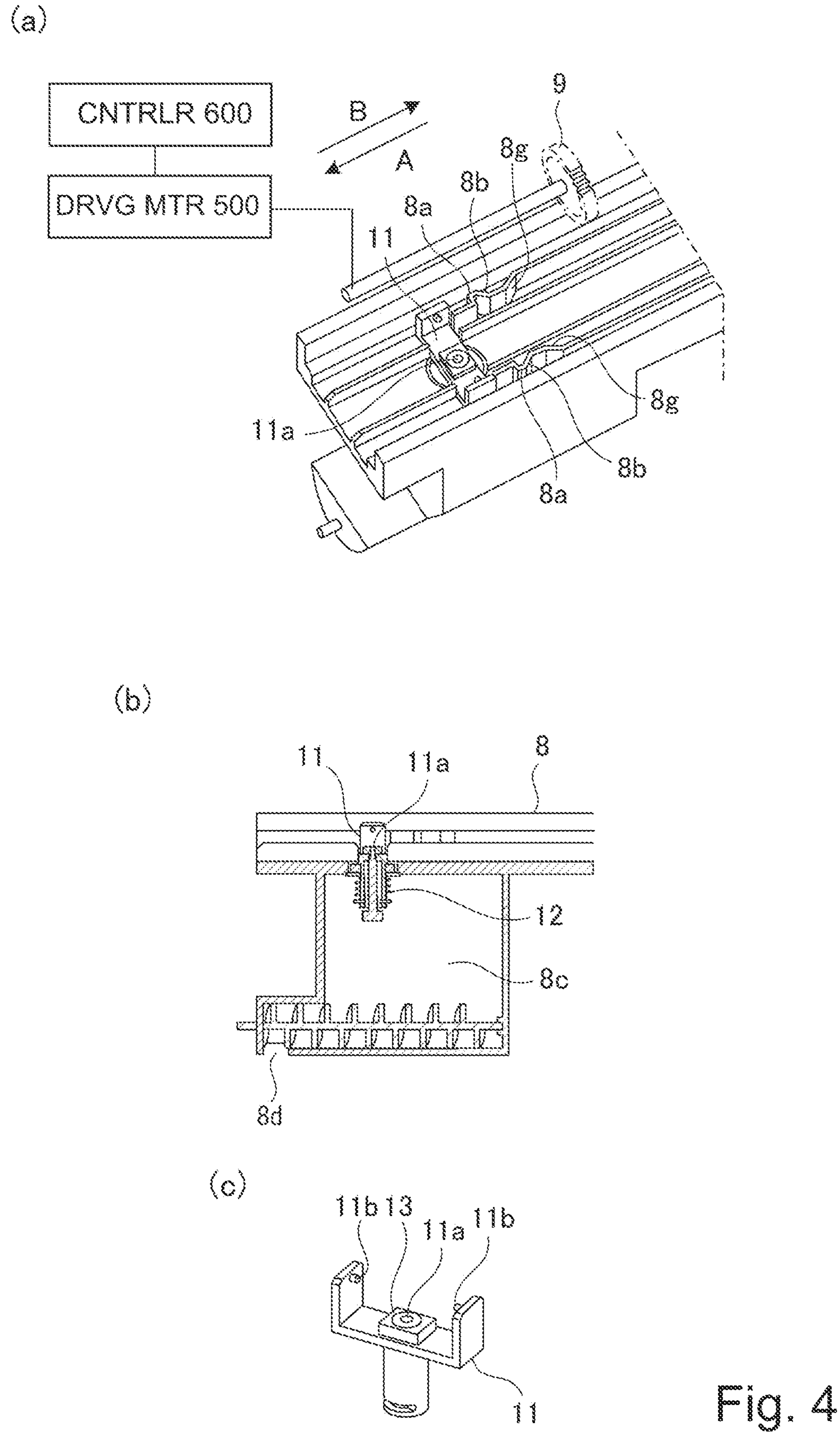

Parts (a), (b) and (c) of FIG. 4 show a developer receiving apparatus according to the Embodiment, in which part (a) is an enlarged partial perspective view thereof, part (b) is an enlarged cross sectional view thereof, and part (c) is a perspective view of a developer receiving portion.

Figure 5:
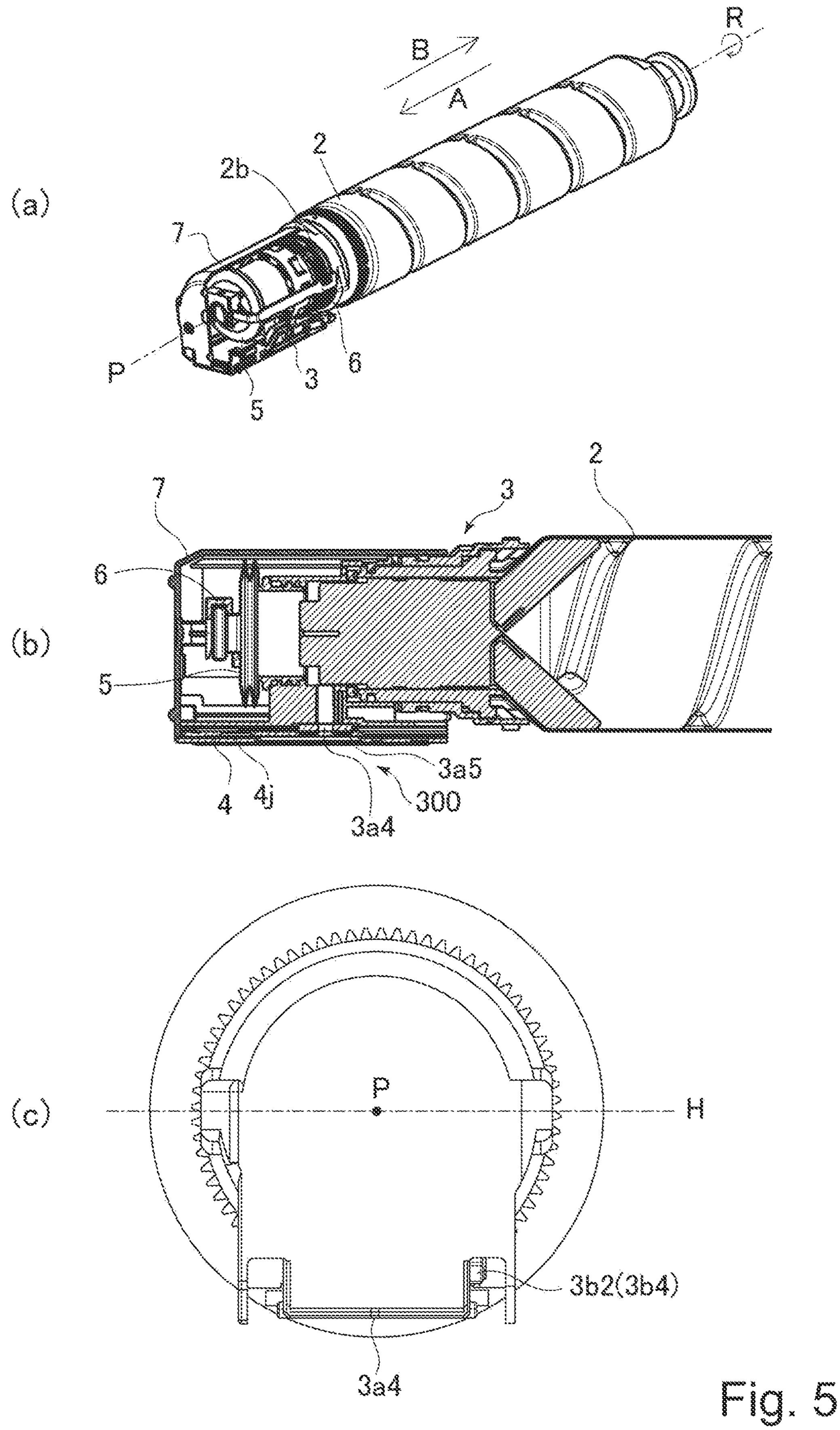

Parts (a), (b) and (c) of FIG. 5 show a developer supply container according to the Embodiment, in which part (a) is a partially cut-away perspective view, part (b) is a cross-sectional view thereof around a flange portion, and (c) is a front elevational view thereof as viewed from a front side.

Figure 6:
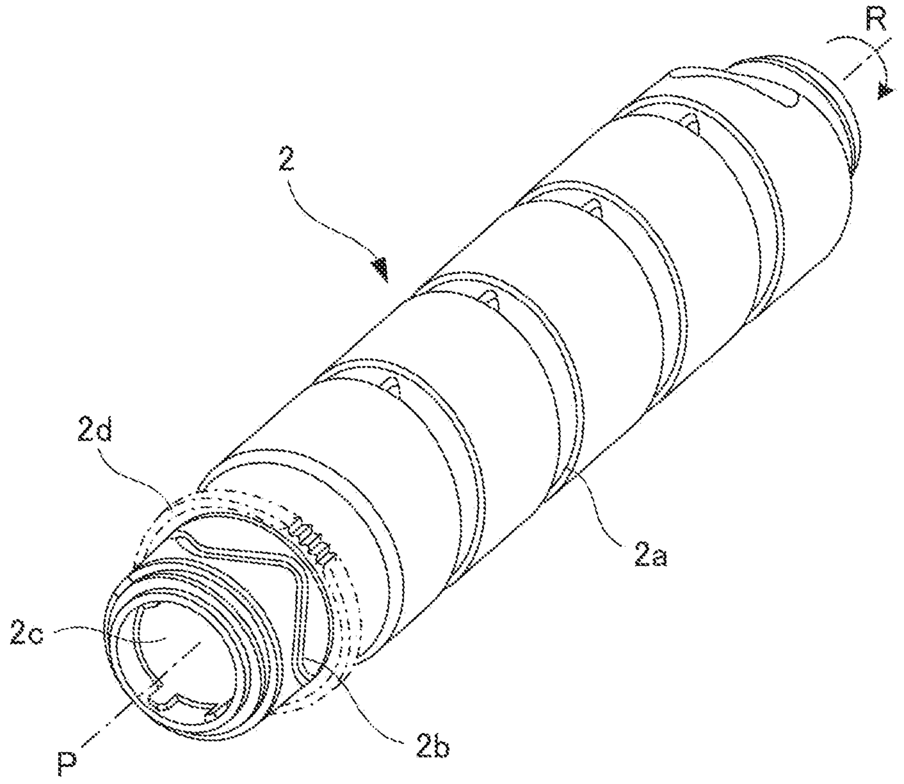

FIG. 6 is a perspective view of the container main body of the developer supply container according to the Embodiment.

Figure 7:
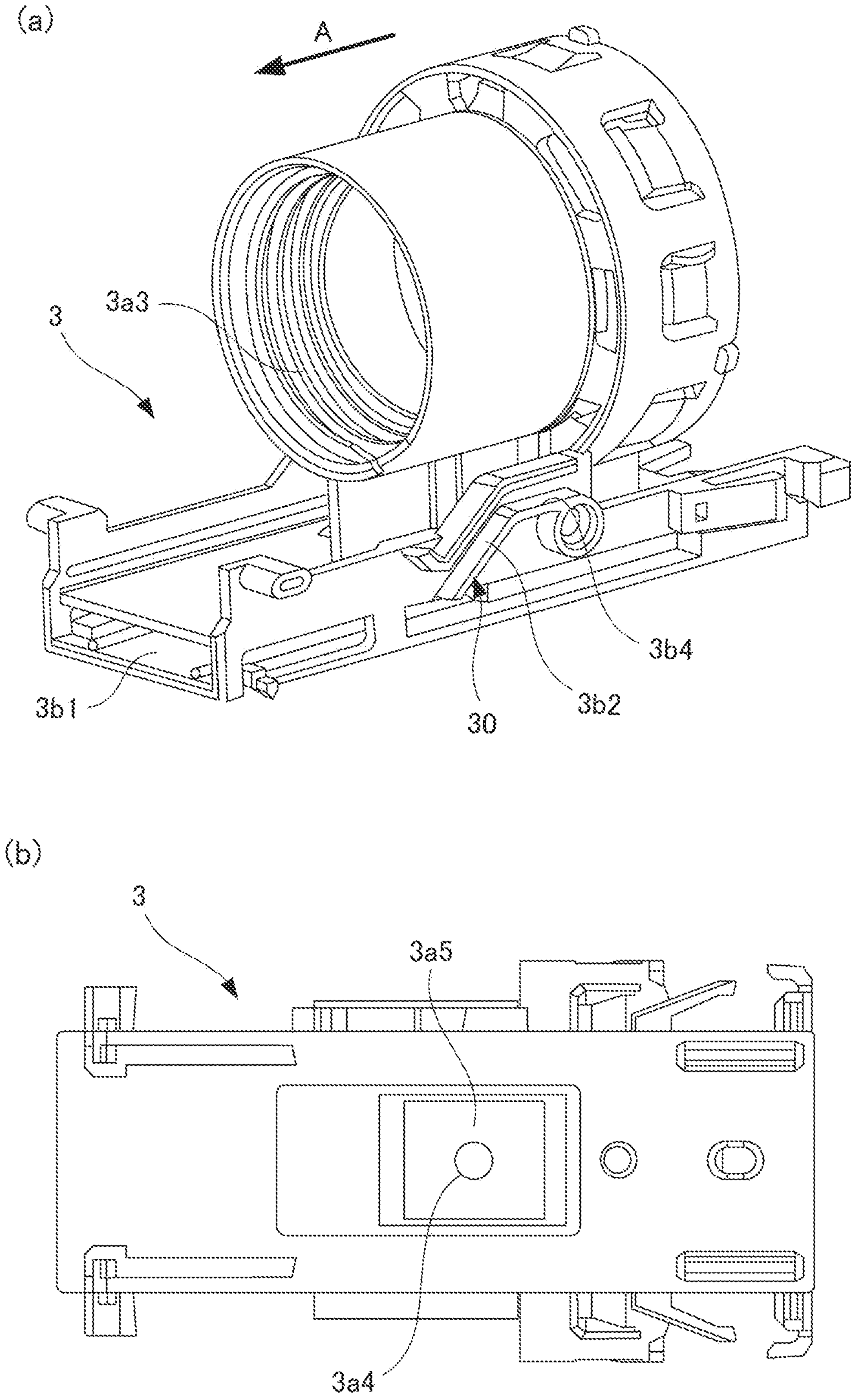

Parts (a) and (b) of FIG. 7 show a flange portion in the Embodiment, in which part (a) is a perspective view thereof, and (b) is a bottom view thereof.

Figure 8:
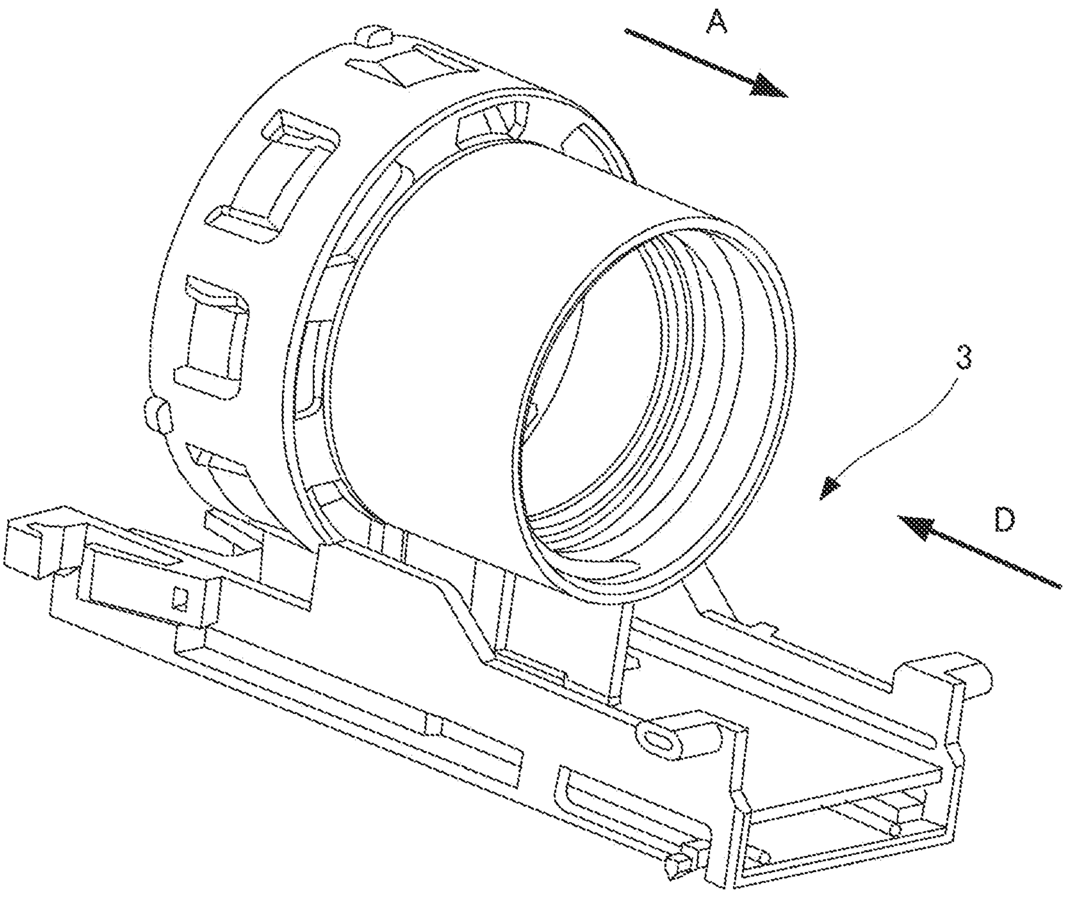

FIG. 8 is a perspective view of the flange portion according to the embodiment as viewed from the side opposite to that of part (a) of FIG. 7.

Figure 9:
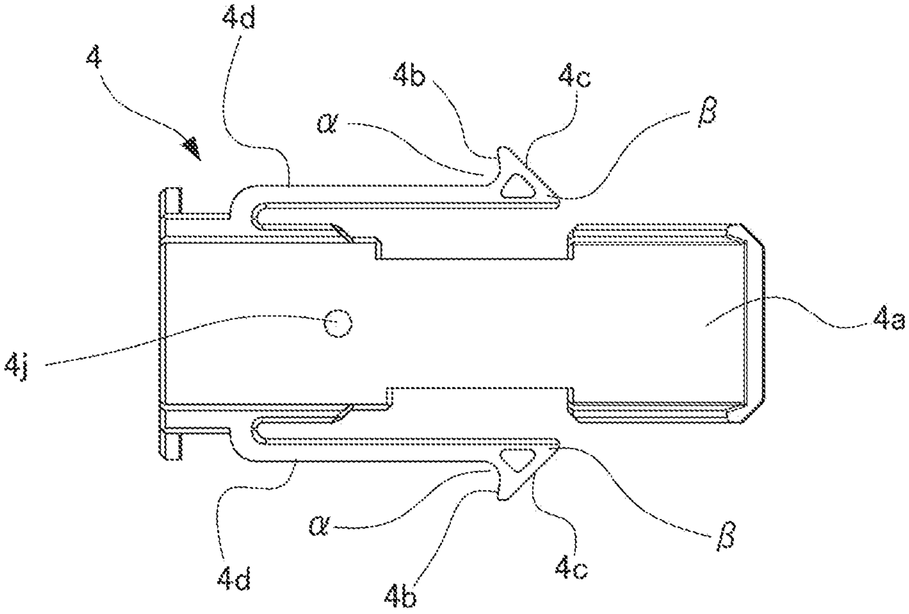
Figure 9:
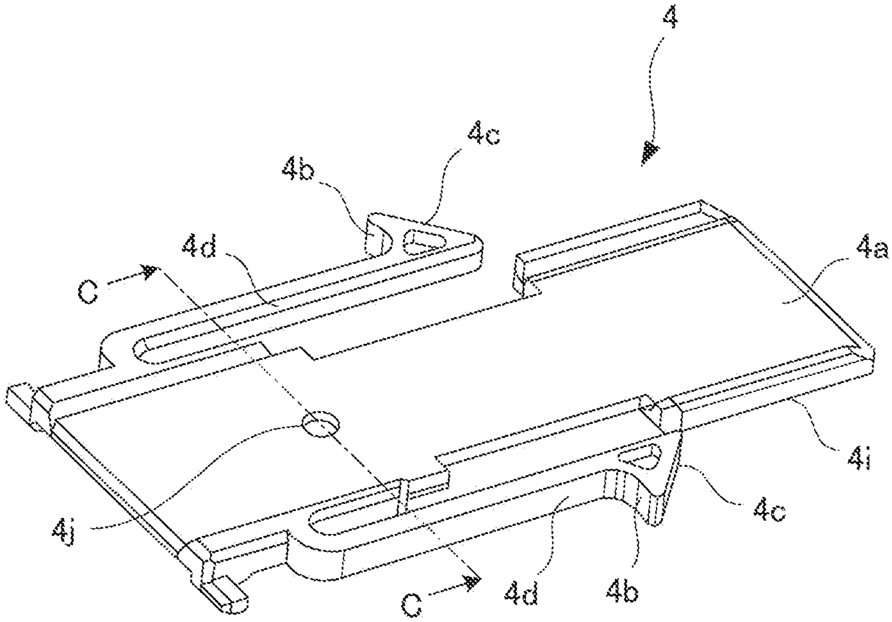
Figure 14:
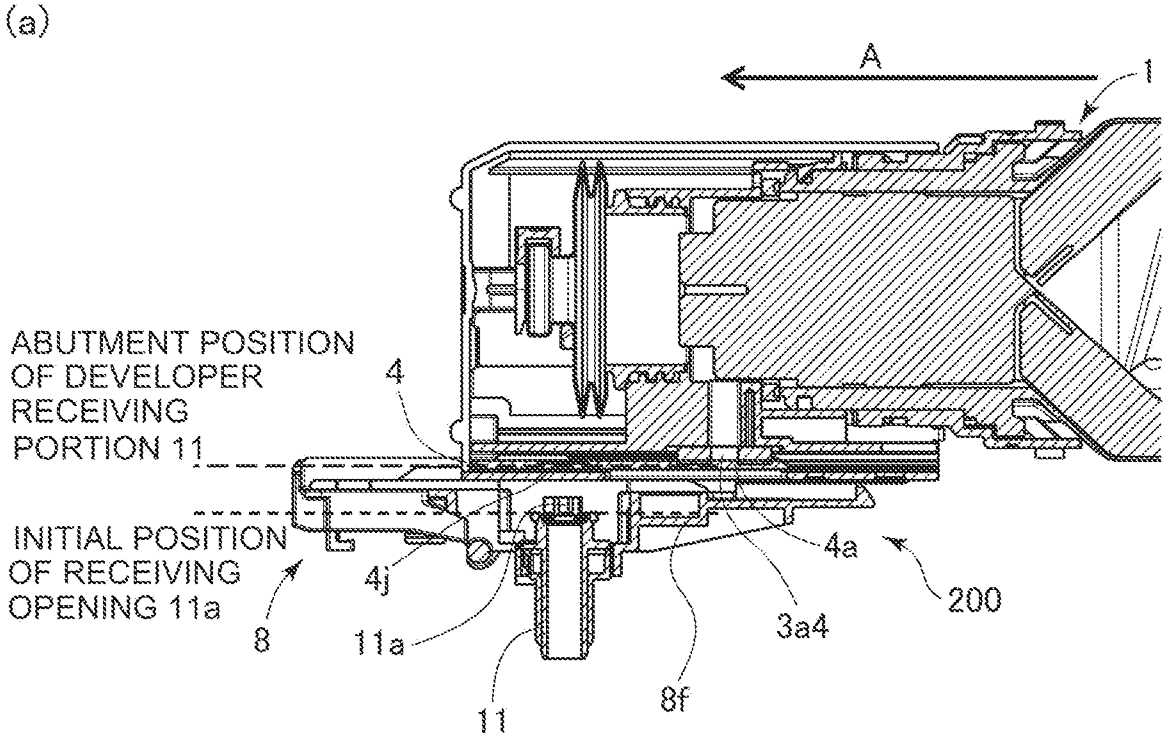
Figure 14:
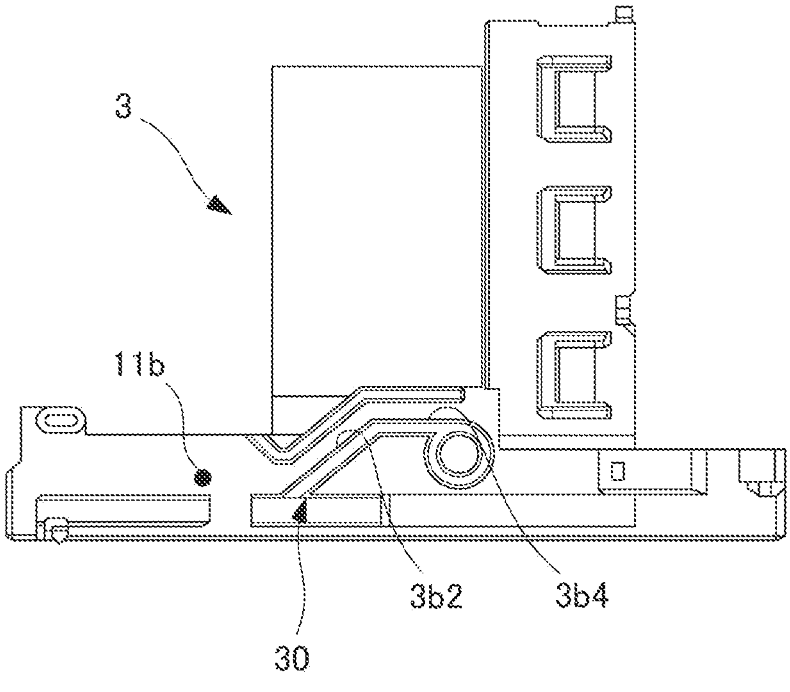

Part (a) FIG. 9 and part (b) of FIG. 9 are top views of the shutter according to the embodiment, and part (b) of FIG. 14 is a perspective view.

Figure 10:
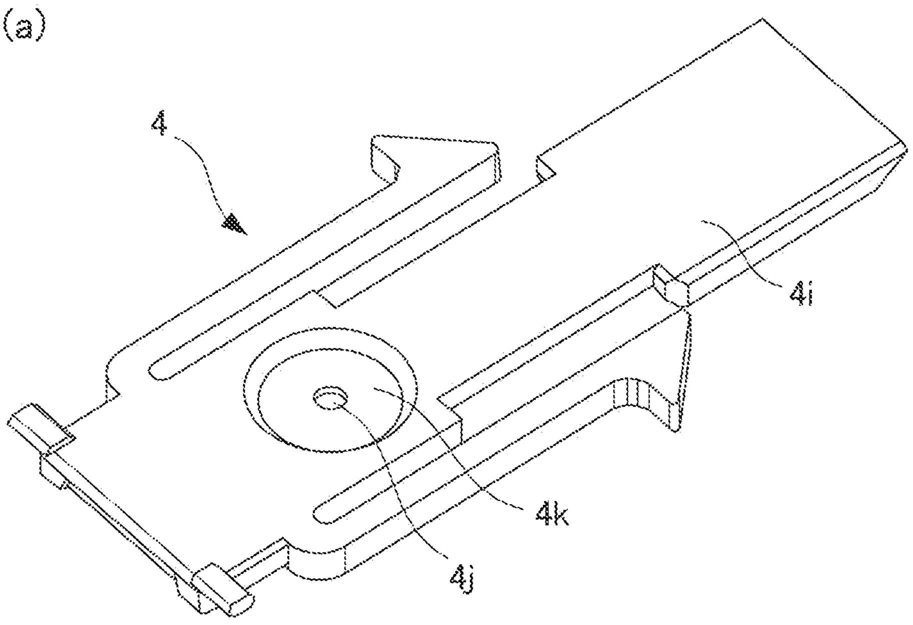
Figure 10:
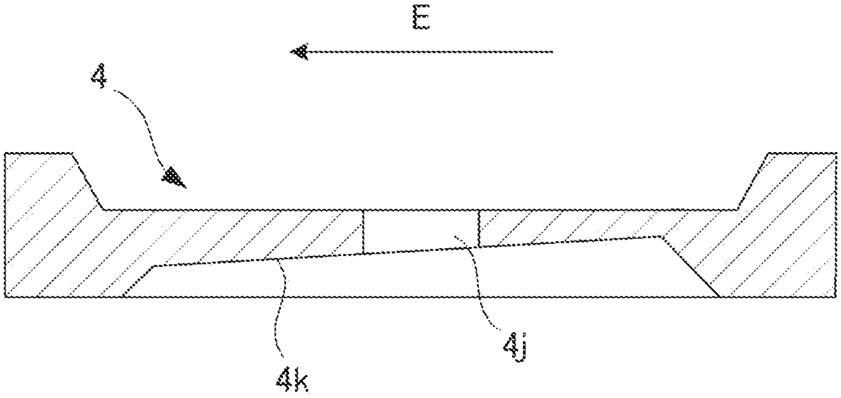

Part (a) of FIG. 10 is a perspective view of the shutter according to the embodiment as viewed from the opposite side of that in part (b) of FIG. 9, and part (b) of FIG. 10 is a sectional view taken along line C-C of part (b) of FIG. 9.

Figure 11:
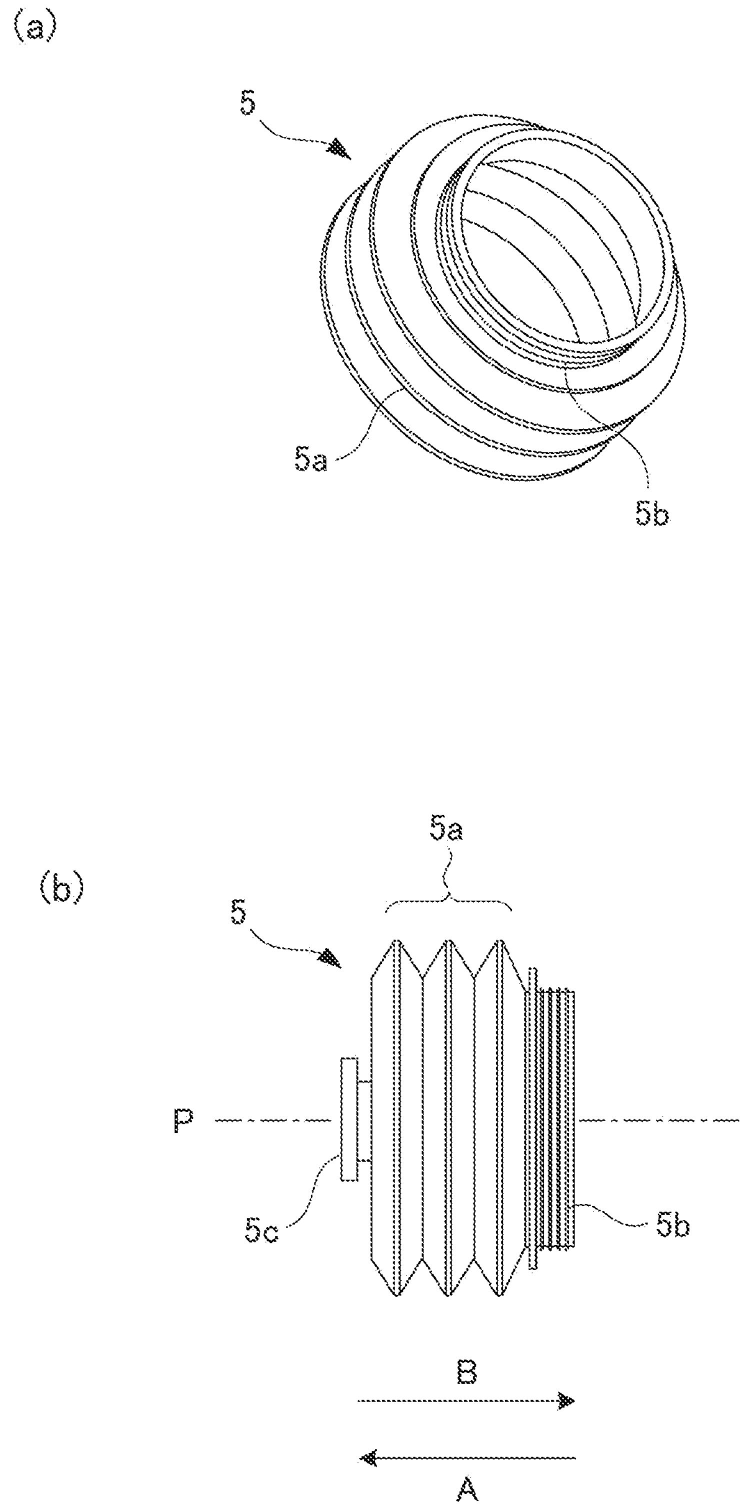

Parts (a) and (b) of FIG. 11 show the pump according to Embodiment 1, in which part (a) is a perspective view, and part (b) is a side view.

Figure 12:
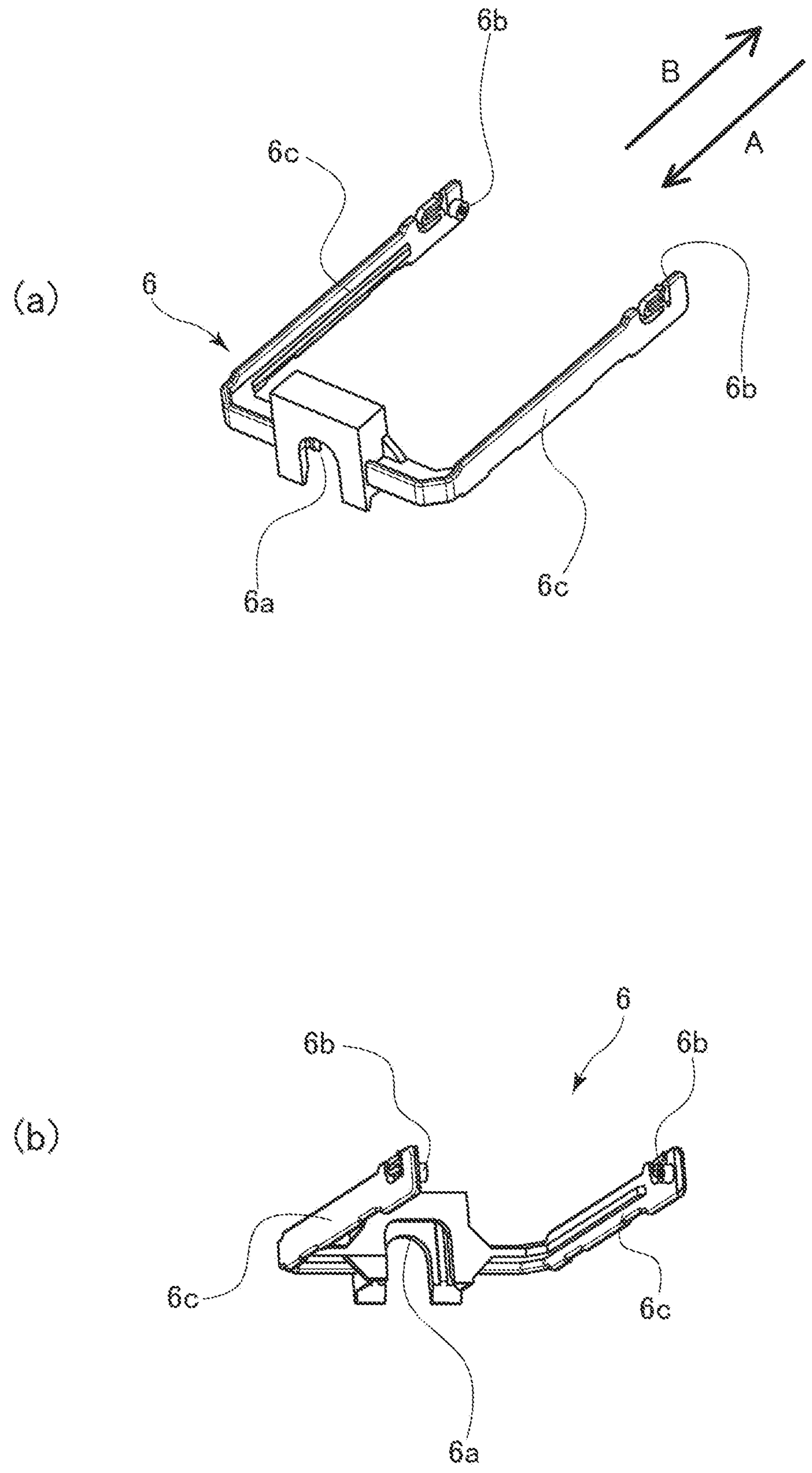

Parts (a) and (b) of FIG. 12 show the reciprocating member according to Embodiment 1, in which part (a) is a perspective view, part (b) is a perspective view as viewed from the opposite side of part (a).

Figure 13:
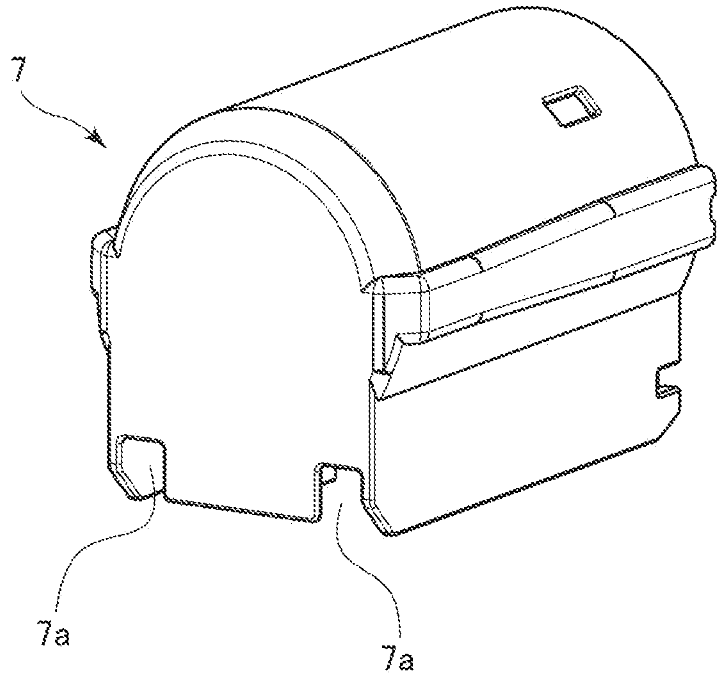
Figure 13:
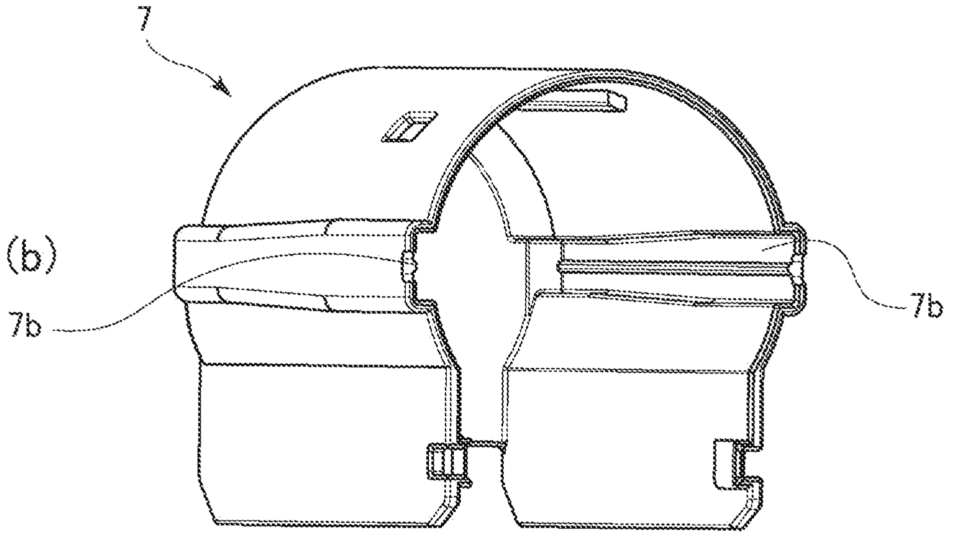

Parts (a) and (b) of FIG. 13 show the cover according to Embodiment 1, in which part (a) is a perspective view, part (b) is a perspective view as viewed from the opposite side of (a).

Part (a) of FIG. 14 is a sectional view of the developer supply container and the developer receiving device according to the embodiment in a state in which the shutter is fixed to the developer receiving device, and part (b) of FIG. 14 is a cross-sectional view showing the position of the engaging portion at that time.

Figure 15:
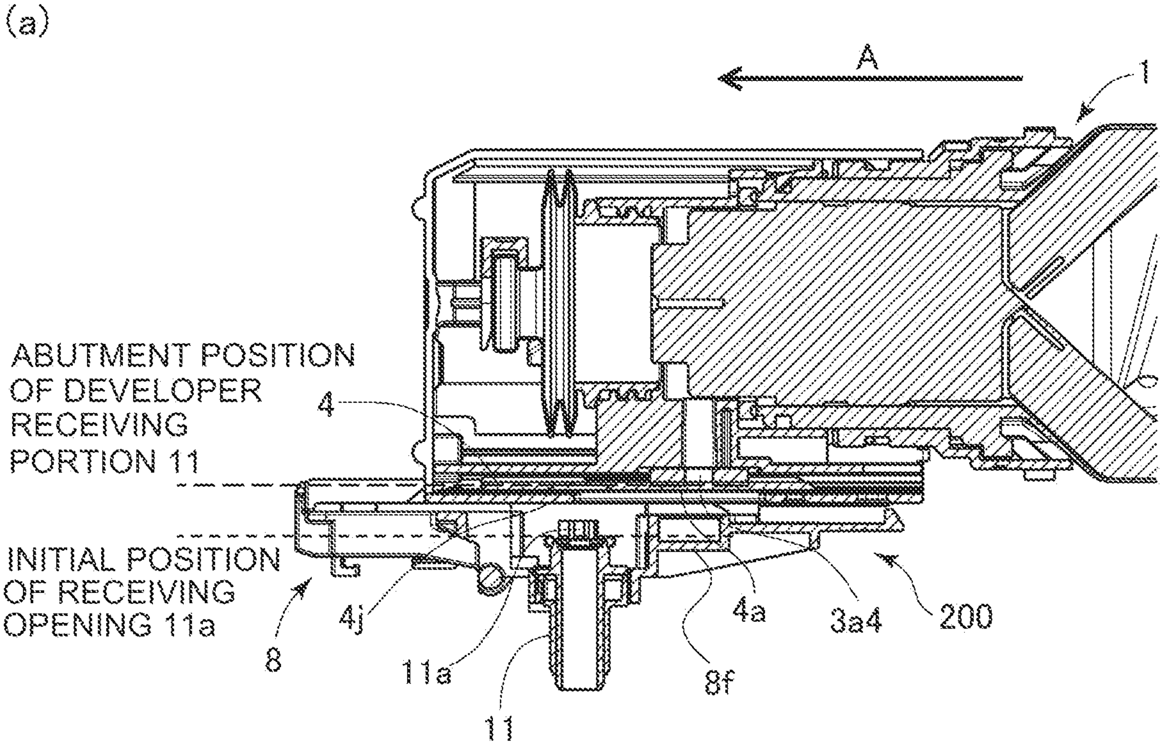
Figure 15:
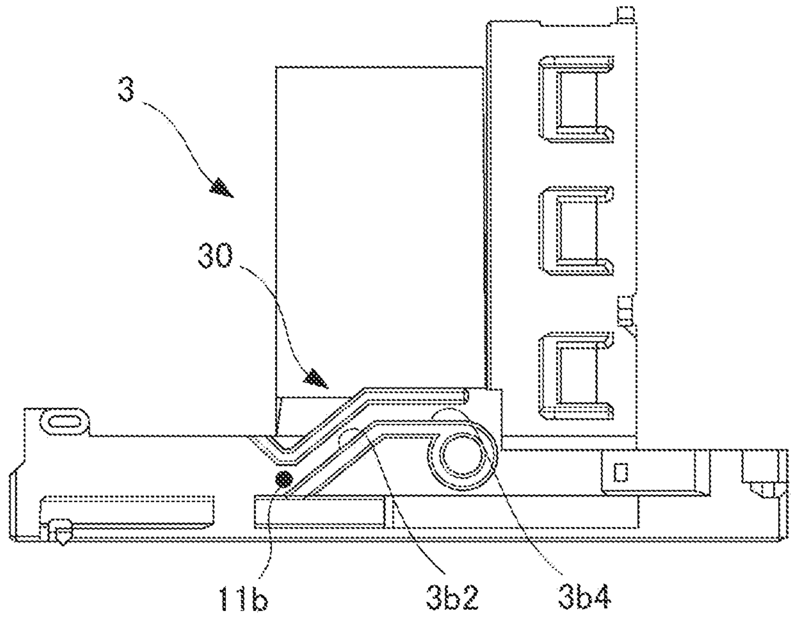

Part (a) of FIG. 15 is a cross-sectional view of the developer supply container and the developer receiving device according to the embodiment in a state in which the engaged portion of the developer receiving portion has started to engage with the engaging portion of the flange portion, and part (b) of FIG. 15 is a view illustrating the position of the engaging portion at that time.

Figure 16:
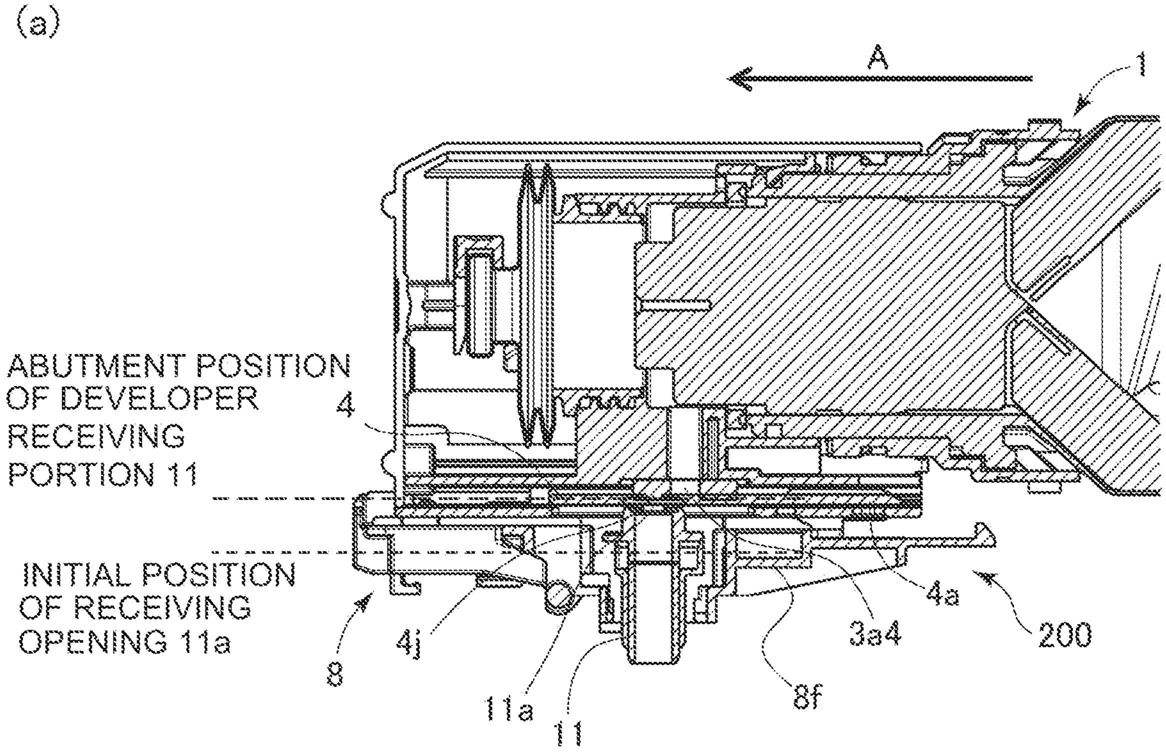
Figure 16:
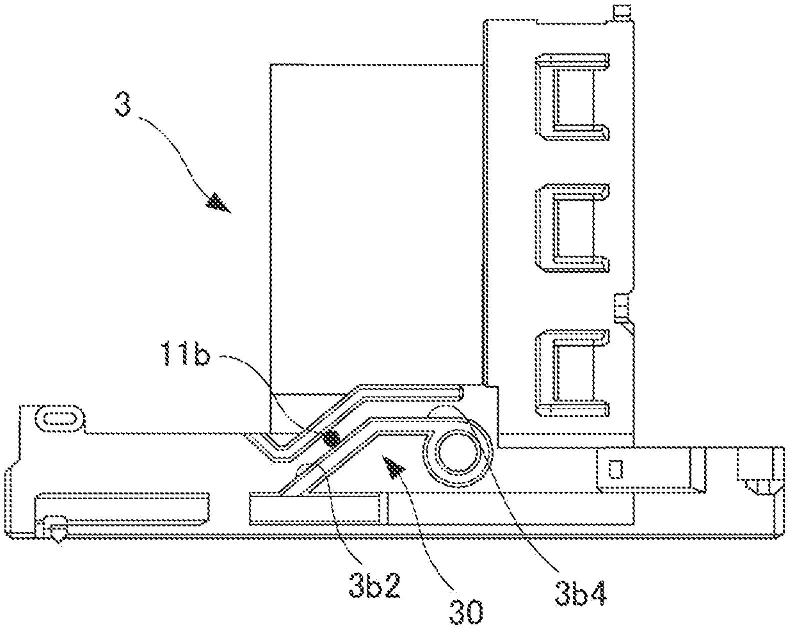

Part (a) of FIG. 16 is a sectional view of the developer supply container and the developer receiving device according to the embodiment while the engaged portion of the developer receiving portion is in engagement with the engaging portion of the flange portion and is moving, and part (b) of FIG. 16 shows the position of the engaging portion at that time.

Figure 17:
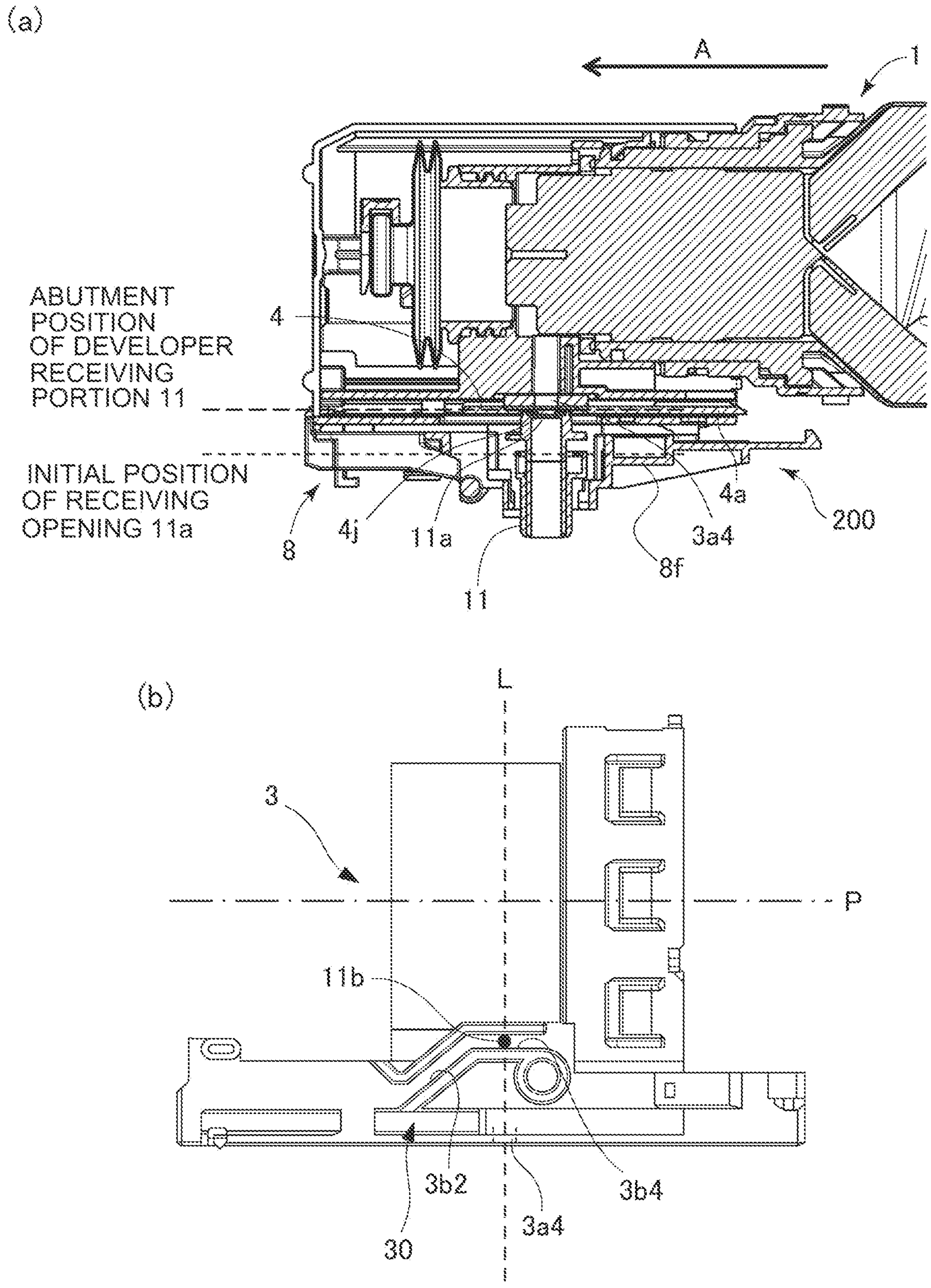

Part (a) of FIG. 17 is a cross-sectional view of the developer supply container and the developer receiving device in a state where mounting of the developer supply container according to the embodiment is completed, and part (b) of FIG. 17 is a sectional view of the engagement portion at that time.

Figure 18:
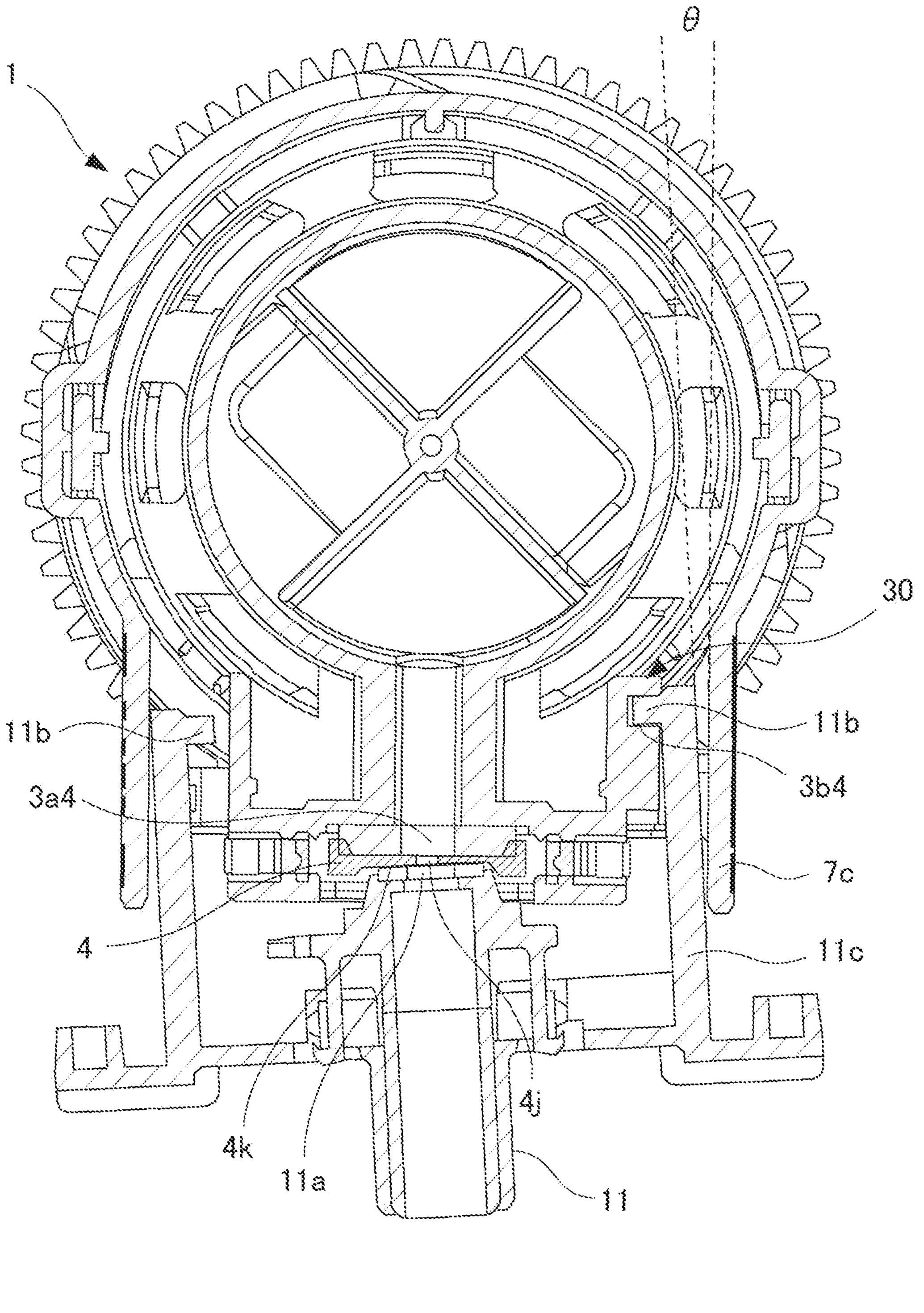

FIG. 18 is a cross-sectional view of the developer supply container and the developer receiving apparatus in a state in which the mounting of the developer supply container according to the embodiment is completed.

Figure 19:
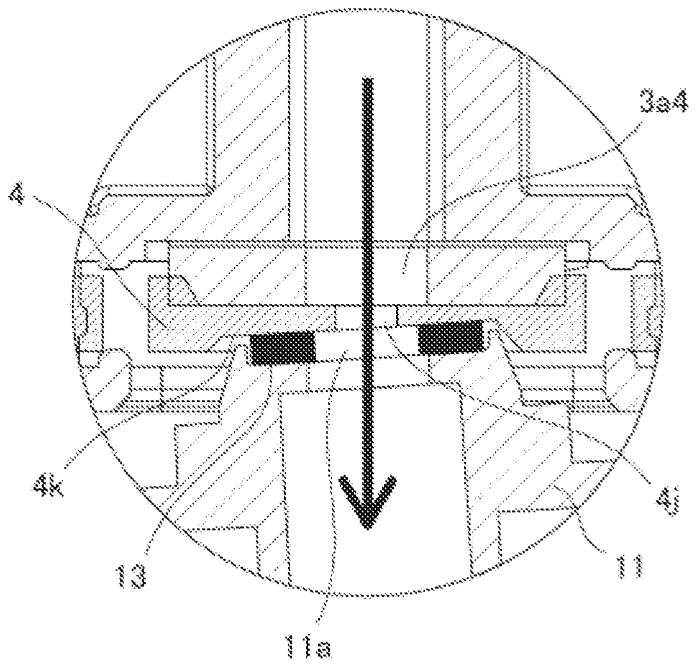

FIG. 19 is a sectional view of the shutter and the developer receiving portion.

Figure 20:
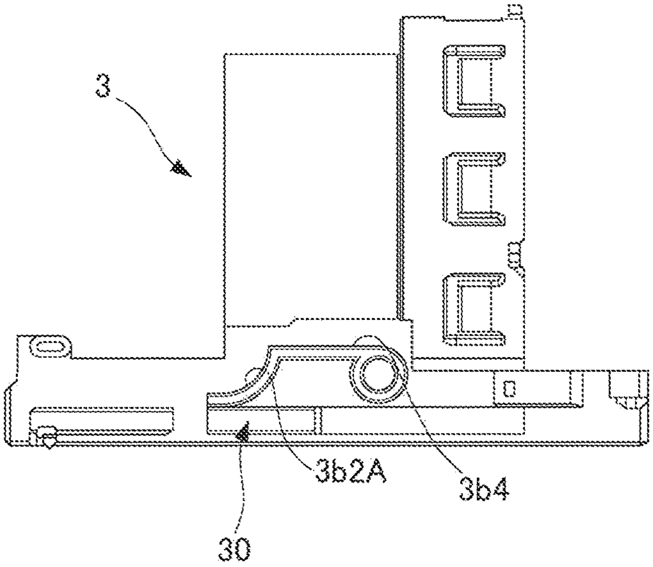
Figure 20:
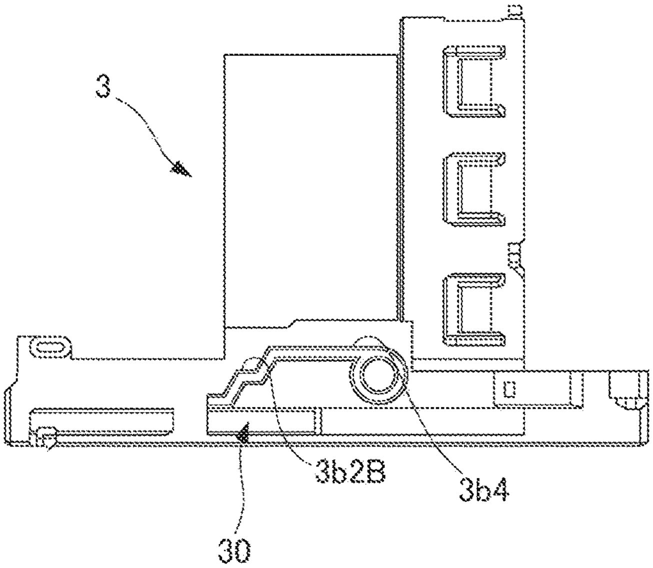
Figure 20:
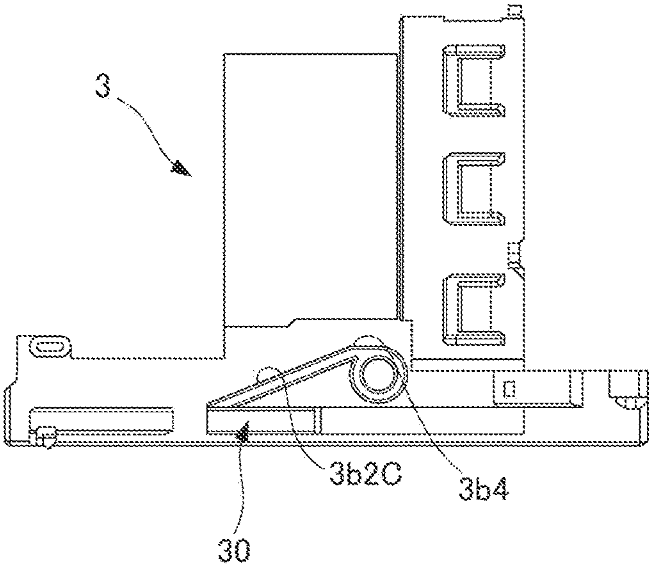

Parts (a), (b) and (c) of FIG. 20 show modifications of the flange portion according to the embodiment, in which (a) is a side view of a first example, (b) is a side view of a second example, and (c) is a side view of a third example.

Figure 21:
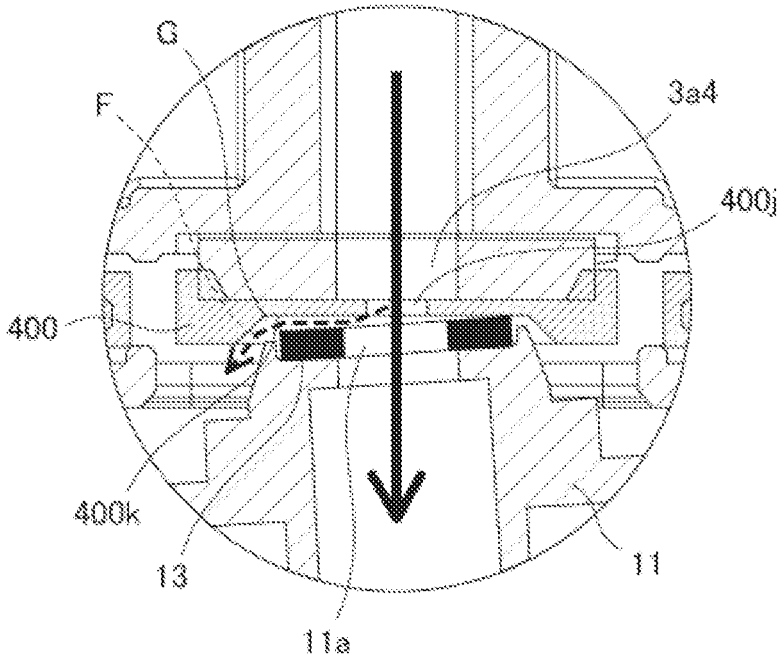
Fig. 21 Prior Art

FIG. 21 is a cross-sectional view of a connecting portion between the shutter and the developer receiving portion according to a comparative example.

DESCRIPTION OF THE EMBODIMENTS

In the following, referring to FIGS. 1-20, Embodiment 1 of the present invention will be described. First, referring to FIG. 1 and FIG. 2, a schematic structure of the image forming apparatus of this embodiment will be described.

[Image Forming Apparatus]

Figure 1:
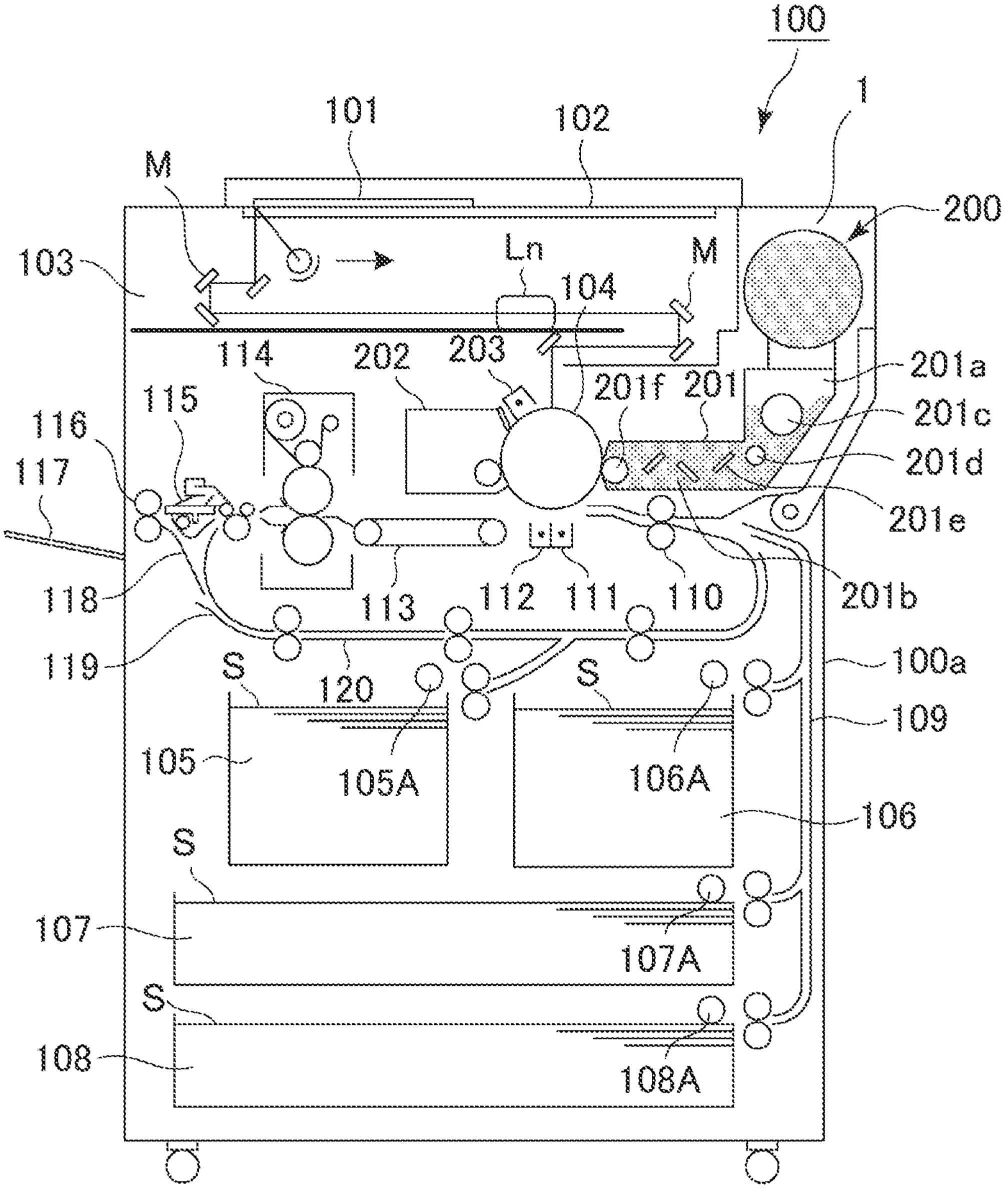
FIG. 1 shows a schematic structure diagram of an image forming apparatus according to an Embodiment.

In FIG. 1, the image forming apparatus 100 includes an original reading device 103 at a top of a main assembly 100*a* of the image forming apparatus. An original 101 is placed on an original platen glass 102. A light image corresponding to image information of the original 101 is imaged, using a plurality of mirrors M and the lens Ln of the original reading device 103, on a photosensitive drum 104 which is a cylindrical photosensitive member as an image bearing member to form an electrostatic latent image. This electrostatic latent image is visualized using toner (one component magnetic toner) as a developer (dry powder) by a dry type developing device (one-component developing device) 201. Here, in this embodiment, a one-component magnetic toner is used as the developer to be supplied from the developer supply container 1 (also referred to as a toner cartridge), but the present invention is not limited to such an example, and it may be of a structure as will be described hereinafter.

More specifically, in the case of using a one-component developing device which performs developing operation with one component nonmagnetic toner, one component nonmagnetic toner is supplied as a developer. In addition, non-magnetic toner is supplied as the developer when using a two-component developer which develops the image using a two component developer prepared by mixing magnetic carrier and nonmagnetic toner. In this case, as the developer, a structure may be employed in which the magnetic carrier is also supplied together with the non-magnetic toner.

As described above, a developing device 201 shown in FIG. 1 develops the electrostatic latent image formed on the photosensitive drum 104 using the toner as the developer based on the image information of the original 101. In addition, a developer supplying system 200 is connected to developing device 201, and the developer supplying system 200 includes a developer supply container 1 and a developer receiving apparatus 8 relative to which the developer supply container 1 is mountable and dismountable. Developer supplying system 200 will be described hereinafter.

The developing device 201 includes a developer hopper portion 201*a* and a developing roller 201*f*. In this developer hopper portion 201*a*, a stirring member 201*c* for stirring the developer supplied from the developer supply container 1 is provided. The developer stirred by the stirring member 201*c* is fed to a feeding member (201*e*) side by a feeding member 201*d*. And, the developer which has been sequentially fed by the feeding members 201*e* and 201*b* is carried on the developing roller 201*f* and finally supplied to a developing zone where it is opposed to the photosensitive drum 104. In this embodiment, a one-component developer is used, and therefore, toner as a developer from the developer supply container 1 is supplied to the developing device 201, but when using a two component developer, toner and carrier as a developer may be supplied from the developer supply container.

Cassettes 105 to 108 contain recording materials S such as sheets of paper. When an image is to be formed, a cassette containing an optimum recording material S among the sheets contained in these cassettes 105 to 108 is selected on the basis of the information inputted by the operator (user) on the operation portion 100*d* of the image forming apparatus 100 or on the basis of the size of the original 101. Here, as for the recording material S, it is not limited to sheets of paper, but it may be an OHP sheet or the like as the case may be. One sheet of recording material S fed by the feeding and separating devices 105A to 108A is fed to registration rollers 110 by way of a feeding portion 109. Then, the recording material S is fed in synchronization with the rotation of the photosensitive drum 104 and the scan timing of the original reading device 103.

A transfer charging device 111 and a separation charging device 112 are provided at positions opposing the photosensitive drum 104 on a downstream side of the registration roller 110 in the recording material feeding direction. The image of the developer (toner image) formed on the photosensitive drum 104 is transferred onto the recording material S fed by the registration roller 110, by a transfer charging device 111. And, the recording material S onto which the toner image is transferred is separated from the photosensitive drum 104 by a separation charging device 112. Subsequently, heat and pressure are applied to the recording material S fed by the feeding portion 113 in a fixing portion 114, so that the toner image is fixed on the recording material. Thereafter, the recording material S to which the toner image is fixed passes through a discharge/reversing portion 115 and is discharged to the discharge tray 117 by the discharge roller 116, in case of single-sided copy.

On the other hand, in case of double-sided copy, the recording material S passes through the discharge/reversing portion 115, and the recording material S is partly discharged to the outside of the apparatus once by the discharge roller 116. After this, at the timing when a trailing end of the recording material S passes through the switching member 118 and is still nipped by the discharge rollers 116, the position of the switching member 118 is switched, and the discharge roller 116 is rotated counterclockwise, by which the recording material S is fed again into the apparatus. Thereafter, the recording material S is fed to the registration roller 110 by way of the re-feeding and feeding portions 119 and 120, and is discharged to the discharge tray 117 by way of the same path as in the case of single-sided copying.

In the image forming apparatus 100 having the above-described structure, image forming process devices such as a developing device 201, a cleaner portion 202, a primary charging device 203 and the like are provided around the photosensitive drum 104. Here, the developing device 201 supplies the developer to the electrostatic latent image formed on the photosensitive drum 104 on the basis of the image information of the original 101 read by the original reading device 103 so as to develop the electrostatic latent image. In addition, the primary charging device 203 uniformly charges the surface of the photosensitive drum to form a desired electrostatic latent image on the photosensitive drum 104. Furthermore, the cleaner portion 202 has a function of removing the developer remaining on the photosensitive drum 104.

Figure 2:
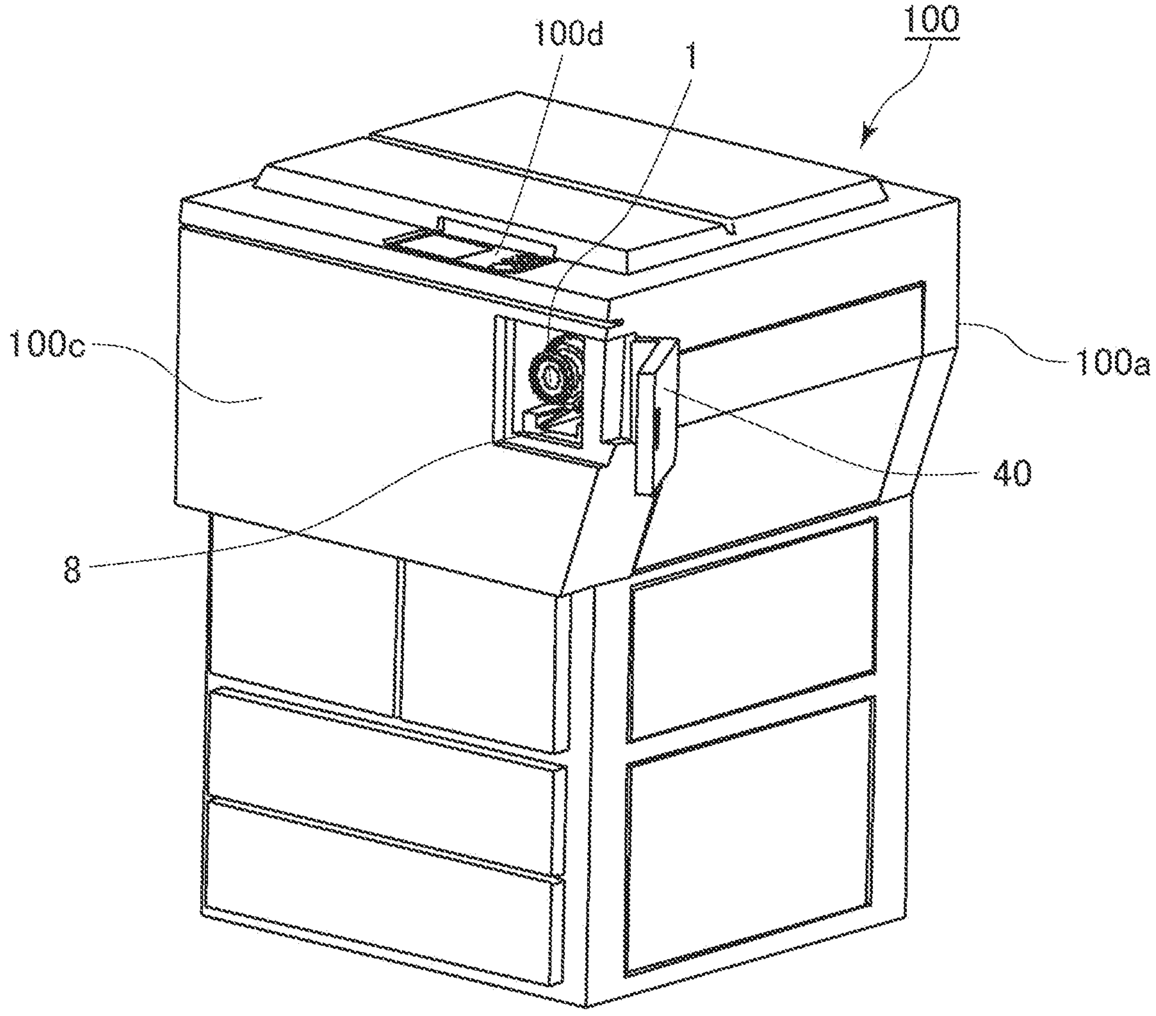
FIG. 2 is a perspective view of the image forming apparatus according to the Embodiment.

As shown in FIG. 2, when the operator opens a replacement cover 40 which is a portion of an outer cover of the apparatus main assembly 100*a* of the image forming apparatus 100, a part of the developer receiving apparatus 8 which will be described hereinafter can be seen. And, by inserting the developer supply container 1 into this developer receiving apparatus 8, the developer supply container 1 is mounted in a state where it can supply the developer to the developer receiving apparatus 8. On the other hand, when the operator exchanges the developer supply container 1, it carries out the operation opposite to the loading operation, by which the developer supply container 1 is dismounted from the developer receiving apparatus 8, and thereafter a new developer supply container 1 can be mounted. Here, the replacement cover 40 is a cover exclusively for mounting/dismounting (exchanging) the developer supply container 1, and is opened and closed only for dismounting/mounting the developer supply container 1. On the other hand, the maintenance operation for the image forming apparatus 100 is performed by opening/closing a front cover 100*c*. Here, the replacement cover 40 and the front cover 100*c* may be integrated. In such a case, the replacement of the developer supply container 1 and the maintenance of the image forming apparatus 100 are performed by opening and closing the integrated cover (not shown).

[Developer Receiving Apparatus]

Next, referring to part (a) of FIG. 3 to part (c) of FIG. 4, the developer receiving apparatus 8 constituting the developer supplying system 200 will be described. As shown in part (a) of FIG. 3, the developer receiving apparatus 8 is provided with a mounting portion (mounting space) 8*f* to which the developer supply container 1 is dismountably mounted. The mounting portion 8*f* is provided with an insertion guide 8*e* for guiding the developer supply container 1 in the mounting and dismounting directions. In the case of this embodiment, the structure is such that the mounting direction of the developer supply container 1 is the direction indicated by A, and the dismounting direction B of the developer supply container 1 is opposite to the direction A of mounting the developer supply container 1, by the insertion guide 8*e*.

As shown in part (a) of FIG. 3 to part (a) of FIG. 4, the developer receiving apparatus 8 has a drive gear 9 which functions as a driving mechanism for driving the developer supply container 1. A rotational driving force is transmitted to the actuating gear 9 from a driving motor 500 by way of a driving gear train (not shown), so that the actuating gear 9 applies the rotational driving force to the developer supply container 1 mounted in the mounting portion 8*f*. The operation of the driving motor 500 is controlled by the control device 600.

In addition to controlling the driving motor 500, the control device 600 controls overall of the image forming apparatus 100. The control device 600 has a CPU (Central Processing Unit), a ROM (Read Only Memory), and a RAM (Random Access Memory). The CPU controls each portion while reading the program corresponding to a control procedure stored in the ROM. In addition, working data and an input data are stored in the RAM, and the CPU executes control while looking up the data stored in the RAM on the basis of the program etc.

In the mounting portion 8*f* of the developer receiving apparatus 8, there is provided a developer receiving portion 11 for receiving the developer discharged out of the developer supply container 1. The developer receiving portion 11 is connected to a container discharge opening 3*a*4 (part (b) of FIG. 5) of the developer supply container 1 when the developer supply container 1 is mounted, and has a receiving opening 11*a* for receiving the developer discharged through the container discharge opening 3*a*4. The developer receiving portion 11 is mounted so as to be movable (displaceable) in the direction in which the receiving opening 11*a* moves toward and away from the container discharge opening 3*a*4 (in this embodiment, the direction crossing with the direction in which the developer supply container 1 is mounted (more specifically, vertical direction relative to the developer receiving apparatus 8)). In the case of this embodiment, as shown in part (b) of FIG. 3, the developer receiving portion 11 is urged by an urging member (spring) 12 in a direction in which the receiving opening 11*a* moves away from the container discharge opening 3*a*4 (vertically downward). Therefore, when the receiving opening 11*a* moves toward the container discharge opening 3*a*4 (upward in the vertical direction), the developer receiving portion 11 moves against the urging force of the urging member 12.

In addition, as shown in part (a) of FIG. 4, a first shutter stopper portion 8*a* and a second shutter stopper portion 8*b* are provided on the mounting portion 8*f* of the developer receiving apparatus 8 in the upstream side, in the mounting direction (direction of arrow A), of the developer receiving portion 11. In the developer supply container 1 which is moving relative to the developer receiving apparatus 8 during mounting and dismounting, the first and second shutter stopper portions 8*a* and 8*b* restrict relative movement of the shutter 4 only (part (a) of FIG. 9 and the like) with respect to the developer receiving apparatus 8, which will be described later. In this case, the shutter 4 moves relative to a portion of the developer supply container 1 other than the shutter 4, such as the container body 2 and the like which will be described later.

As shown in part (b) of FIG. 3 and part (b) of FIG. 4, below the developer receiving apparatus 8 in the vertical direction, a sub hopper 8*c* for temporarily storing the developer supplied from the developer supply container 1 is provided. In this sub hopper 8*c*, a feeding screw 14 for feeding the developer to a developer hopper portion 201*a* (FIG. 1) which is a portion of the developing device 201, and an opening 8*d* communicating with the developer hopper portion 201*a* are provided.

As shown in part (c) of FIG. 4, a main assembly seal 13 formed so as to surround the receiving opening 11*a* is provided in the developer receiving portion 11. The main assembly seal 13 comprises an elastic member, foam and so on. With the developer supply container 1 mounted, the main assembly seal 13 and an opening seal 3*a*5 (part (b) of FIG. 5) surrounding the container discharge opening 3*a*4 of the developer supply container 1 sandwich the shutter 4 (parts (a) and (b) of FIG. 9) in close contact therewith. By this, the developer discharged from the container discharge opening 3*a*4 of the developer supply container 1 through the shutter opening 4*j* (discharge port) of the shutter 4 to the receiving opening 11*a* is prevented from leaking out of the receiving opening 11*a* (developer feed path).

Here, it is desirable that a diameter of the receiving opening 11*a* is substantially the same as or slightly larger than a diameter of the shutter opening 4*j* of the shutter 4, in order to prevent the interior of the mounting portion 8*f* from being contaminated by the developer. This is because if the diameter of the receiving opening 11*a* is smaller than the diameter of the shutter opening 4*j*, the developer discharged from the shutter opening 4*j* is more likely to be deposited on the upper surface of the main assembly seal 13. If the developer is deposited on the lower surface of the developer supply container 1 at the time of mounting/dismounting operation of the developer supply container 1, it becomes a cause of contamination by the developer. In view of this point, it is preferable that the diameter of the receiving opening 11*a* is roughly the same as or about 2 mm larger than the diameter of the shutter opening 4*j*. For example, in the case that the diameter of the shutter opening 4*j* of the shutter 4 is a fine hole (pinhole) of about 2 mm in diameter, it is preferable that the diameter of the receiving opening 11*a* is about 3 mm.

In addition, as shown in part (c) of FIG. 4, on the side surface of the developer receiving portion 11, an engaged portion (portion to be engaged) 11*b* projecting toward the center side is provided. In the case of this embodiment, the engaged portion 11*b* is directly engaged with the engaging portion 30 (part (a) in FIG. 7) provided in the developer supply container 1 which will be described hereinafter, and is guided by the engaging portion 30, by which the developer receiving portion 11 is lifted toward the developer supply container 1 in the upward direction.

[Developer Supply Container]

Next, referring to part (a) FIG. 5 to part (b) of FIG. 12, the developer supply container 1 constituting the developer supplying system 200 will be described. First, referring to part (a) of FIG. 5 and part (b) of FIG. 5, the overall structure of the developer supply container 1 will be described. The developer supply container 1 mainly includes the container body 2, a flange portion 3, the shutter 4, a pump portion 5, a reciprocating member 6, and a cover 7. The developer supply container 1 supplies the developer to the developer receiving apparatus 8 by rotating in the developer receiving apparatus 8 in the direction indicated by an arrow R about the rotation axis P shown in part (a) of FIG. 5. In the following, each element constituting the developer supply container 1 will be described in detail.

[Container Body]

As shown in FIG. 6, the container body 2 mainly comprises a developer accommodating portion 2*c* for containing the developer. In addition, the container body 2 is provided with a helical feeding groove 2*a* (feeding portion) for feeding the developer in the developer accommodating portion 2*c* by rotating the container body 2 in the direction of the arrow R around the rotation axis P. In addition, as shown in FIG. 6, a cam groove 2*b* and a drive receiving portion 2*d* for receiving a driving force from the main assembly side are integrally formed over the entire periphery of the outer circumferential surface of the container body 2 on one end side. Here, in this embodiment, the cam groove 2*b* and the drive receiving portion (gear) 2*d* are integrally formed with the container body 2, but the cam groove 2*b* or the drive receiving portion 2*d* may be formed as a separate member and may be integrally mounted to the container body 2. In addition, in this embodiment, for example, a toner including a volume average particle diameter of 5 μm to 6 μm is accommodated in the developer accommodating portion 2*c* as the developer. In addition, in this embodiment, the developer accommodating portion 2*c* includes not only the container body 2 but also the interior spaces of the flange portion 3 and the pump portion 5 which will be described hereinafter.

[Flange Portion]

Referring to part (a) of FIG. 5, part (b) of FIG. 5, part (a) of FIG. 7 through FIG. 8, the flange portion 3 will be described. The flange portion 3 is mounted so as to be rotatable relative to the container body 2 about the rotation axis P. And, when the developer supply container 1 is mounted to the developer receiving apparatus 8, the flange portion 3 is held so as not to rotate in the arrow R direction relative to the mounting portion 8*f* (part (a) of FIG. 3). In addition, as shown in part (b) of FIG. 7, a container discharge opening 3*a*4 is provided in a portion of the flange portion 3, and an opening seal 3*a*5 is mounted to the periphery thereof. As shown in parts (a) and (b) of FIG. 5, the flange portion 3 is provided with the pump portion 5, the reciprocating member 6, the shutter 4, and the cover 7.

First, as shown in part (b) of FIG. 5, the pump portion 5 is threaded at one end side of the flange portion 3, and the container body 2 is connected to the other end side with a sealing member (not shown) therebetween. In addition, a reciprocating member 6 is provided so as to sandwich the pump portion 5, and the engaging projection 6*b* (parts (a) and (b) of FIG. 12) provided on the reciprocating member 6 is engaged with the cam groove 2*b* (FIG. 6). The flange portion 3 is provided with the shutter 4. In this embodiment, the flange portion 3 and the shutter 4 constitute a discharge portion 300 for discharging the developer accommodated in the developer accommodating portion 2*c* out. In addition, the surface on which the shutter 4 is provided is the bottom side of the flange portion 3. In addition, in order to improve the outer appearance and to protect the reciprocating member 6 and the pump portion 5, a cover 7 is integrally provided so as to cover the flange portion 3, the pump portion 5, and the reciprocating member 6 as a whole, as shown in part (b) of FIG. 5.

[Engaging Portion]

The flange portion 3, as shown in part (a) of FIG. 7, is provided with an engaging portion 30 engageable with the engaged portion 11*b* (part (c) of FIG. 4) of the developer receiving portion 11. The engaging portion 30 displaces the developer receiving portion 11 toward the developer supply container 1 according to the mounting operation of the developer supply container 1 and connects them to each other, so that it becomes possible to replenish the developer from the developer supply container 1 to the developer receiving portion 11. In addition, along with the removal operation of the developer supply container 1, the engaging portion 30 performs guiding such that the developer receiving portion 11 is displaced in a direction away from the developer supply container 1, by which the connection state between the developer supply container 1 and the developer receiving portion 11 is ceased.

The engaging portion 30 has a first engaging surface 3*b*2 on the downstream side in the mounting direction of the developer supply container 1 and a second engaging surface 3*b*4 formed so as to be continuous with the upstream side of the first engaging surface 3*b*2. Part (c) of FIG. 5 is a front view of the developer supply container 1. As shown in part (c) of FIG. 5, the first engaging surface 3*b*2 and the second engaging surface 3*b*4 are disposed below the plane H including the rotation axis P. Furthermore, the plane H including the rotation axis P is a horizontal plane, and the first engaging surface 3*b*2 and the second engaging surface 3*b*4 are disposed below this horizontal plane. The developer receiving portion 11 is guided upward by engaging the engaged portion 11*b* with the first engaging surface 3*b*2 in accordance with the mounting operation of the developer supply container 1. By this, the receiving opening 11*a* communicates with the container discharge opening 3*a*4 by the engaged portion 11*b* engaging with the second engaging surface 3*b*4. Although details will be described hereinafter, the engaging portion of this embodiment has the following structure. The inclined portion (first portion) 3$b$2 and the parallel portion (second portion) 3$b$4 extending from the lower end (the first position) toward the upper end (the second position) constitute the tracks where the engaged portion 11$b$ passes. And, as shown in part (c) of FIG. 5, the track is arranged below the plane H. Also, when the plane including the rotation axis is imagined, the discharge opening and the track are provided in the same region (lower region). In such a case, the parallel portion 32 is disposed at a position closer to the horizontal plane H or the imaginary plane than the inclined portion 31. Also, in this embodiment, in the developer receiving portion 11, the engaged portion 11$b$ and the receiving opening are on the same plane perpendicular to the rotation axis P. As a result, the engaged portion 11$b$ and the parallel portion 32 are on the same plane perpendicular to the rotation axis P. The engaged portion 11$b$ is engaged with this track, and the engaged portion 11$b$ is lifted so that the discharge opening and the receiving opening can communicate with each other. And, when the communication path is formed, a discharge path is formed between the inside of the developer supply container and the discharge opening so that the developer in the developer supply container can be discharged toward the receiving port. In the following, more detailed explanation will be made.

The first engaging surface 3$b$2 displaces the developer receiving portion 11 in a direction crossing with the mounting direction of the developer supply container 1 so that the opening operation of the developer receiving portion 11 is performed. In this embodiment, the first engaging surface 3$b$2 displaces the developer receiving portion 11 toward the developer supply container 1 in accordance with the mounting operation of the developer supply container 1 so that the developer receiving portion 11 is connected to a part of the opening seal 3$a$5 of the developer supply container 1. In order to accomplish this, the first engaging surface 3$b$2 extends in a direction crossing with the mounting direction of the developer supply container 1. More specifically, the first engaging surface 3$b$2 is an inclined surface which is inclined such that the engaged portion 11$b$ is guided in a direction in which the receiving opening 11$a$ of the developer receiving portion 11 communicates with the container discharge opening 3$a$4 in accordance with the mounting operation of the developer supply container 1. In this embodiment, the first engaging surface 3$b$2 is inclined so as to face upward such that as it goes from the downstream side to the upstream side in the mounting direction of the developer supply container 1.

In addition, the first engaging surface 3$b$2 has such a shape that as it approaches to the drive receiving portion 2$d$, it extends upward on the axis of rotation P. Here, in this embodiment, the first engaging surface 3$b$2 has a linear shape. It is desirable that the angle of inclination of the first engaging surface 3$b$2 with respect to the mounting and dismounting direction of the developer supply container 1 is 10 to 50 degrees. In this embodiment, this inclination angle is about 40 degrees.

Here, the first engaging surface 3$b$2 is not limited to this structure as long as it extends upward as approaching toward the drive receiving portion 2$d$. For example, as shown in part (a) of FIG. 20, the shape of a first engaging surface 3$b$2A may be a curved inclined surface. Furthermore, as shown in part (b) of FIG. 20, the shape of the first engaging surface 3$b$2B may be a stepped shape including a parallel surface and an inclined surface. In addition, as shown in part (c) of FIG. 20, the first engaging surface 3$b$2C and the second engaging surface 3$b$4 may be integrated to form a uniform linear inclined surface.

On the other hand, the second engaging surface 3$b$4 maintains the position of the developer receiving portion 11 so that the container discharge opening 3$a$4 is brought into a state of communicating with the receiving opening 11$a$ of the developer receiving portion 11, in accordance with the mounting operation of the developer supply container 1. That is, while the developer supply container 1 is moving relative to the shutter 4 after the developer receiving portion 11 is connected to a part of the opening seal 3$a$5 of the developer supply container 1, the connection state between the main assembly seal 13 and the opening seal 3$a$5 is maintained. In other words, while the receiving opening 11$a$ is connected to a part of the opening seal 3$a$5 and then is moved to the container discharge opening 3$a$4, the state in which the main assembly seal 13 and the opening seal 3$a$5 are connected with each other is maintained and the receiving opening 11$a$, and the receiving opening 11$a$ communicates with the container discharge opening 3$a$4. To achieve this, the second engaging surface 3$b$4 extends in a direction parallel to the mounting direction of the developer supply container 1. More specifically, the second engaging surface 3$b$4 is a substantially horizontal surface. In this embodiment, the engaging portion (the second engaging surface 3$b$4) engaged with the engaged portion 11$b$ is substantially parallel to the mounting direction or the rotation axis P, but the engaging portion corresponding to the second engaging surface 3$b$4 of this embodiment is not limited to be parallel, and it may be inclinded.

Furthermore, in this embodiment, as shown in part (a) of FIG. 7, the engaging portion 30 is provided only on one side surface of the flange portion 3 in a predetermined direction which intersects the mounting direction of the developer supply container 1 and crosses with the displacing direction of the developer receiving portion 11. In this embodiment, this predetermined direction is a direction perpendicular to the mounting direction (arrow A direction) of the developer supply container 1 and perpendicular to the displacing direction (vertical direction) of the developer receiving portion 11, it is the leftright direction as viewed in the direction of the arrow D shown in FIG. 8. And, the engaging portion 30 is provided only on one side surface of both side surfaces in the predetermined direction of the flange portion 3. Therefore, as shown in FIG. 8, the engaging portion 30 is not provided on the other side surface of the flange portion 3 in the predetermined direction. Here, in the flange portion 3 of this embodiment, although the engaging portion 30 is not provided on the side surface on the left side as viewed in the direction of the arrow D in FIG. 8, it may be reversed.

[Shutter]

Next, referring to part (a) FIG. 9 through part (b) of FIG. 9, the shutter 4 will be described. The shutter 4 slidable on the shutter insertion portion 3$b$1 (part (a) of FIG. 7) of the flange portion 3 move relative to a portion (flange portion 3) of the developer supply container 1. The shutter 4 has a shutter opening 4$j$ as a discharge opening, and opens and closes the container discharge opening 3$a$4 (part (b) in FIG. 7) of the developer supply container 1 in accordance with the mounting and dismounting operation of the developer supply container 1. That is, by moving the shutter 4 relative to the developer supply container 1 in accordance with the mounting operation of the developer supply container 1, the receiving opening 11$a$ of the developer receiving portion 11 and the shutter opening 4$j$ communicate with each other, and in addition with the container discharge opening 3$a$4. By this, the developer in the developer supply container 1 can be discharged to the receiving opening 11*a*. That is, the discharge portion 300 (part (b) of FIG. 5) for discharging the developer is constituted by the flange portion 3 and the shutter 4, and the shutter 4 of the discharge portion 300 is provided with the shutter opening 4*j* as the discharge opening for discharging the developer.

On the other hand, as shown in parts (a) and (b) of FIG. 9, a developer sealing portion 4*a* is provided at a position deviated from the shutter opening 4*j* of the shutter 4. The developer sealing portion 4*a* closes the container discharge opening 3*a*4, and as the shutter 4 moves relative to the developer supply container 1 in accordance with the operation of taking out the developer supply container 1. In addition, the developer sealing portion 4*a* prevents leakage of the developer from the container discharge opening 3*a*4, when the developer supply container 1 is not mounted to the mounting portion 8*f* (part (a) of FIG. 3) of the developer receiving apparatus 8. The back side (developer receiving portion (11) side) is provided with a sliding surface 4*i* which slides on the shutter insertion portion 3*b*1 of the flange portion 3. Here, the shutter 4 is engaged with the flange portion 3 in an attitude in which the developer sealing portion 4*a* faces upward.

The shutter 4 is provided with a first stopper portion 4*b* and a second stopper portion 4*c* held by first and second shutter stopper portions 8*a* and 8*b* (part (a) of FIG. 4) of the developer receiving apparatus 8 doing so that the developer supply container 1 is capable of moving relative to the shutter 4. In addition, the shutter 4 is provided with a support portion 4*d* for displaceably supporting the first and second stopper portions 4*b* and 4*c*. The support portion 4*d* is elastically deformable and extends from one side to other side of the developer sealing portion 4*a*. And, the first stopper portion 4*b* and the second stopper portion 4*c* are provided at the free end portion of the support portion 4*d*. By this, the first and second stopper portions 4*b*, 4*c* can be displaced by the elasticity of the support portion 4*d*.

Here, the first stopper portion 4*b* is inclined so that an angle α formed by the first stopper portion 4*b* and the support portion 4*d* is an acute angle. On the contrary, the second stopper portion 4*c* is inclined so that an angle β formed by the second stopper portion 4*c* and the support portion 4*d* is an obtuse angle.

When the developer supply container 1 is mounted, the first stopper portion 4*b* is engaged with the guide portion 8*g* of the developer receiving apparatus 8 and is displaced to pass through the second shutter stopper portion 8*b*, thus engaging with the first shutter stopper portion 8*a*. By engaging the first stopper portion 4*b* and the first shutter stopper portion 8*a*, the position of the shutter 4 with respect to the developer receiving apparatus 8 is fixed, and the shutter 4 and the developer supply container 1 can move relative to each other. The second stopper portion 4*c* is engaged with the second shutter stopper portion 8*b* of the developer receiving apparatus 8 at the time of removing the developer supply container 1 so that the first stopper portion 4*b* disengages from the first shutter stopper portion 8*a*. By this, the shutter 4 is disengaged from the developer receiving apparatus 8.

In addition, as shown in parts (a) and (b) of FIG. 10, the shutter 4 has a connecting surface 4*k* connected to the developer receiving portion 11 so as to surround the shutter opening 4*j* of the sliding surface 4*i*. Part (b) of FIG. 10 shows a sectional view of the neighborhood of the shutter opening 4*j* of the shutter 4 (C-C cross-sectional view of part (b) of FIG. 9). Here, the direction C in part (b) of FIG. 9 is the same as the direction D in FIG. 8. As shown in part (b) of FIG. 10, the connecting surface 4*k* is an inclined surface inclined toward the developer receiving portion as going from one side to the other side in the predetermined direction (the direction of arrow E). In part (b) of FIG. 10, the connecting surface 4*k* is inclined downward as going from the right side to the left side. That is, as explained in part (a) of FIG. 7 and FIG. 8, the connecting surface 4*k* is inclined downward as going from the side provided with the engaging portion 30 toward the side not provided with the engaging portion 30. The shutter opening 4*j* is formed in the inclined connecting surface 4*k* as described above.

[Pump Portion]

Referring to parts (a) and (b) of FIG. 11, the pump portion 5 will be described. The pump portion 5 alternately and repeatedly changes the internal pressure of the developer accommodating portion 2*c*, switching between a state lower than the atmospheric pressure and a state higher than atmospheric pressure by the driving force received by the drive receiving portion 2*d* of the container body 2 (FIG. 6). In this embodiment, in order to stably discharge the developer through the small container discharge opening 3*a*4 as described above, the pump portion 5 is provided at a portion of the developer supply container 1. The pump portion 5 is a displacement type pump in which a volume is changed. More specifically, the pump portion 5 employed in this embodiment has a bellows-like stretchable member capable of expanding and contracting.

The pressure inside the developer supply container 1 is changed by the expansion and contracting operations of the pump portion 5, and the developer is discharged by utilizing the pressure. More specifically, when the pump portion 5 is contracted, the interior of the developer supply container 1 is brought into a compressed state, and the developer is pushed out to discharge through the container discharge opening 3*a*4 of the developer supply container 1. In addition, when the pump portion 5 is expanded, the interior of the developer supply container 1 is brought into a reduced pressure state, and the air is taken in from the outside through the container discharge opening 3*a*4. By air taken in, the developer in the container discharge opening 3*a*4 and in the neighborhood of the storage portion 3*a*3 (part (a) in FIG. 7) that stores the developer transported from the container body 2 of the flange portion 3 is loosened and smoothly discharged.

That is, in the neighborhood of the container discharge opening 3*a*4 of the developer supply container 1 and the neighborhood of the storage portion 3*a*3, the developer in the developer supply container 1 may gather due to vibrations imparted when transporting the developer supply container 1 and so on, with the possible result that the developer is caked in this portion. Therefore, as described above, the air is taken in through the container discharge opening 3*a*4, so that it is possible to loosen the developer that has been caked. In addition, in the usual discharging operation of the developer, as air is taken in as described above, the air and the powder as the developer are mixed with the result that the flowability of the developer is enhanced, and therefore, clogging of the developer does not easily occur, as an additional advantage. By repeatedly performing the expansion and contracting operation as described above, the developer is discharged.

As shown in part (a) of FIG. 11, in the pump portion 5, a joint portion 5*b* is provided so as to be able to be joined with the flange portion 3 on the opening end side (dismounting direction B). In this embodiment, screw threads are formed as the joint portion 5*b*. In addition, as shown in part (b) of FIG. 11, the pump portion 5 has a reciprocating member engaging portion 5*c* which engages with the reciprocating member 6 (parts (a) and (b) of FIG. 12), which will be described hereinafter, on the other end side.

In addition, as shown in part (b) of FIG. 11, the pump portion 5 has a bellows-shaped expandable portion (bellows portion, expansion and contraction member) 5*a* in which crests and bottoms are alternately formed periodically. The expansion and contraction portion 5*a* is capable by being folded in the direction of the arrow A or expanded in the direction of the arrow B along the folding lines (with folding lines as the base point). Therefore, when the bellows-like pump portion 5 as employed in this embodiment, it is possible to reduce variations in volumetric change with respect to the expansion and contraction amount, and therefore, it is possible to accomplish the stable volumetric change.

Here, in this embodiment, polypropylene resin is used as the material of the pump portion 5, but the present invention is not limited to this example. As for the material (material) of the pump portion 5, any material may be used as long as it has an expansion and contraction function and is capable of changing the internal pressure of the developer accommodating portion by changing the volume. For example, ABS (acrylonitrile-butadiene-styrene copolymer), polystyrene, polyester, polyethylene, and so on are usable. Or, rubber, other stretchable materials or the like can also be used.

[Reciprocating Member]

Referring to parts (a) and (b) of FIG. 12, the reciprocating member 6 will be described. As shown in parts (a) and (b) of FIG. 12, in order to change the volume of the pump portion 5, the reciprocating member 6 is provided with a pump engaging portion 6*a* (part (b) of FIG. 11) which engages with the reciprocating member engaging portion 5*c* provided on the pump portion (part (b) of FIG. 10). In addition, the reciprocating member 6 is provided with an engaging projection 6*b* to be engaged with the above-described cam groove 2*b* (FIG. 6) at the time of assembly. The engaging projection 6*b* is provided at the free end portion of the arm 6*c* extending in the mounting and dismounting direction (arrows A and B in the Figure) from the neighborhood of the pump engaging portion 6*a*. In addition, the reciprocating member 6 is regulated in rotation around the rotation axis P (part (a) of FIG. 5) of the arm 6*c* by the reciprocating member holding portion 7*b* (part (b) of FIG. 13) of the cover 7 which will be described hereinafter. Therefore, when the container body 2 is driven by the drive receiving portion 2*d* by the driving gear 9, and the cam groove 2*b* rotates integrally, the reciprocating member 6 reciprocates back and forth in the directions A and B by the urging action of the engaging projection 6*b* fitted in the cam groove 2*b* and the reciprocating member holding portion 7*b* of the cover 7. Accordingly, the pump portion 5 engaged with the pump engaging portion 6*a* of the reciprocating member 6 by way of the reciprocating member engaging portion 5*c* expands and contracts in the direction B and the direction A.

[Cover]

Referring to parts (a) and (b) of FIG. 13, the cover 7 will be described. As described above, the cover 7 is provided as shown in part (b) of FIG. 5 for the purpose of improving the appearance of the developer supply container 1 and protecting the reciprocating member 6 and the pump portion 5. In more detail, the cover 7 is provided so as to cover the entirety of the flange portion 3, the pump portion 5, and the reciprocating member 6. As shown in part (a) of FIG. 13, the cover 7 is provided with a guide groove 7*a* to be guided by the insertion guide 8*e* (part (a) of FIG. 3) of the developer receiving apparatus 8. In addition, as shown in part (b) of FIG. 13, the cover 7 is provided with a reciprocating member holding portion 7*b* for restricting rotation of the reciprocating member 6 about the rotation axis P (part (a) of FIG. 5).

[Operation of Mounting Developer Supply Container]

Referring to parts (a) of FIG. 17 to (b) of FIG. 17, an operation of mounting the developer supply container 1 to the developer receiving apparatus 8 will be described. Part (a) of FIG. 14 to part (b) of FIG. 17 are illustrations showing respective timings when the developer supply container 1 is mounted to the developer receiving apparatus 8.

When the developer supply container 1 is inserted into the apparatus main assembly 100*a* of the image forming apparatus 100 in the direction A (part (a) of FIG. 5), the shutter 4 comes into contact with the developer receiving apparatus 8 at the position shown in part (a) of FIG. 14, so that the position of the shutter 4 with respect to the developer receiving apparatus 8 is fixed. In this position, the positions of the developer supply container 1 and the shutter 4 are not displaced relative to each other, and therefore, the container discharge opening 3*a*4 of the flange portion 3 is sealed by the developer sealing portion 4*a* of the shutter 4. At this time, as shown in part (b) of FIG. 14, the first engaging surface 3*b*2 of the engaging portion 30 provided on the one side of the flange portion 3 and the engaged portion 11*b* of the developer receiving portion 11 are not yet engaged.

When the developer supply container 1 is further inserted in the direction A from this state, the developer supply container 1 is displaced relative to the shutter 4 in a state in which the shutter 4 is fixed to the developer receiving apparatus 8, as shown in part (a) of FIG. 15. However, as shown in part (b) of FIG. 15, the first engaging surface 3*b*2 of the flange portion 3 and the engaged portion 11*b* of the developer receiving portion 11 are in the beginning of engagement to each other, and therefore, the upward position of the receiving opening 11*a* remains at the initial position.

When the developer supply container 1 is further inserted in the direction A from this state, the developer supply container 1 is further displaced relative to the shutter 4 as shown in part (a) of FIG. 16. At the same time, as shown in part (b) of FIG. 16, the engaged portion 11*b* of the developer receiving portion 11 is displaced along the first engaging surface 3*b*2 of the flange portion 3. By this, the developer receiving portion 11 is lifted above the initial position so that the receiving opening 11*a* comes into contact with the shutter opening 4*j* of the shutter 4. That is, the developer receiving portion 11 rises to a position where it abuts against the shutter 4. However, in this state, the shutter opening 4*j* and the container discharge opening 3*a*4 are not yet in communication with each other.

When the developer supply container 1 is further inserted in the direction A from this state, the engaged portion 11*b* of the developer receiving portion 11 is displaced in parallel along the second engaging surface 3*b*4, as shown in part (b) of FIG. 17, and therefore, the receiving opening 11*a* and the shutter opening 4*j* are kept in contact with each other. Here, as shown in part (b) of FIG. 17, the positional relation between the container discharge opening 3*a*4 and the second engaging surface 3*b*4 is such that a plane L perpendicular to the rotation axis P and passing through the container discharge opening 3*a*4 passes through the second engaging surface 3*b*4. In addition, the plane including the second engaging surface 3*b*4 is disposed between the rotation axis P and the container discharge opening **3*a*4. On the other hand, as the developer supply container 1 further displaces relative to the shutter 4, the shutter opening 4*j* and the container discharge opening 3*a*4 finally communicate with each other, as shown in part (a) of FIG. 17. In this state, the container discharge opening 3*a*4, the shutter opening 4*j*, and the receiving opening 11*a* communicate with each other, so that it is possible to replenish the developer from the developer supply container 1 to the developer receiving portion 11**.

As shown in part (a) of FIG. 7 and FIG. 8, the engaging portion 30 is provided only on one side of both sides in the predetermined direction of the flange portion 3. For this reason, the action of lifting upward does not act on the engaged portion **11*b* of the developer receiving portion 11 on the side without the engaging portion 30 at the time of mounting operation of the developer supply container 1 described above. As a result, as shown in FIG. 18, the developer receiving portion 11** itself is lifted upward in an inclined state.

Here, as in the comparative example shown in FIG. 19, if the connection surface **400*k* connected to the developer receiving portion 11 of the shutter 400 is formed substantially horizontally without being inclined, there is a likelihood that a gap G is formed between the connection surface 400*k* and the main assembly seal 13 of the developer receiving portion 11. That is, the contact between the connection surface 400*k* and the main assembly seal 13 may be insufficient. In this state, when the operation of supplying the developer from the developer supply container 1 to the developer receiving apparatus 8 is performed, a part of the developer discharged through the container discharge opening 3*a*4 and the shutter opening 400*j* may leak as indicated by an arrow F and may scatter into the developer receiving apparatus 8**.

On the contrary, in the case of this embodiment, as shown in part (b) of FIG. 10, the connecting surface **4*k* is inclined downward, toward the side where the engaging portion 30 of the flange portion 3 is not provided from the side where the engaging portion 30 is not provided. For this reason, as shown in FIG. 19, even if the developer receiving portion 11 is inclined, the connecting surface 4*k* follows the main assembly seal 13 of the developer receiving portion 11, so that the contact can be surely made. Therefore, it is possible to supply the developer from the developer supply container 1 to the developer receiving apparatus 8** without scattering of the developer as in the comparative example.

Here, the inclined direction of the developer receiving portion 11 changes depending on the side surface of the flange portion 3 where the engaging portion 30 is not provided, and therefore, the inclining direction of the connecting surface **4*k*** is selected correspondingly to such a side.

In addition, the inclination angle of the connecting surface **4*k* is selected depending on the inclination angle of the developer receiving portion 11. As shown in FIG. 18, in the developer receiving portion 11, the wall 11*c* provided with the engaged portion 11*b* is raised while being guided inside the wall 7*c* provided in the cover 7 of the developer supply container 1. Therefore, the developer receiving portion 11 is inclined until the wall 11*c* is displaced and abuts against the wall 7*c* about the engagement position between the second engaging surface 3*b*4 and the engaged portion 11*b*. For this reason, the inclination angle of the connecting surface 4*k* is made equal to the angle (θ in FIG. 18) formed between the wall 11*c* and the wall 7*c* at this time. That is, the inclination angle of the connecting surface 4*k* is adjusted by the distance between the wall 7*c* and the wall 11*c***.

Here, in the foregoing description, the connecting surface **4*k* of the shutter 4 is inclined, but the contact surface of the developer receiving portion 11 side, for example, the upper surface of the main assembly seal 13 may be inclined in accordance with the inclination angle of the developer receiving portion 11. In addition, both the connecting surface 4*k* and the contact surface on the developer receiving portion 11** side may be inclined.

In addition, in the foregoing description, the shutter opening **4*j* of the shutter 4 is the discharge opening with which the receiving opening 11*a* of the developer receiving portion 11 communicates, but the receiving opening of the developer receiving portion may be brought into direct contact with the container discharge opening of the developer supply container 1** without providing the shutter. In such a case, the container discharge opening is the discharge opening communicating with the receiving opening.

INDUSTRIAL APPLICABILITY

According to the present invention, a developer supply container and a developer supply system suitable for an electrophotographic image forming apparatus and the like are provided.

DESCRIPTION OF SYMBOLS

1=developer supply container: **2*c*=developer storing portion: 3=flange portion: 3*a*4=container discharge opening: 3*b*2, 3*b*2A, 3*b*2B, 3*b*2C=first engaging surface (inclinded surface): 4=shutter: 4*j*=shutter opening (discharge port): 4*k*=connecting surface (inclined surface): 8=developer receiving device: 11=developer receiving portion: 11*a*=reception opening: 11*b*=engaged portion: 30=engagement portion: 200=developer supply system: 300**=discharge portion

The invention claimed is:

1. A developer supply container configured to accommodate developer, the developer supply container comprising:

a developer discharging portion that is provided with a discharge passageway extending to outside of the developer supply container, with the discharge passageway configured to discharge the developer accommodated in the developer supply container;

a feeding portion configured to be rotatable relative to the developer discharging portion about a rotational axis to feed the developer to the discharge passageway;

a track provided outside of the developer discharging portion with respect to a first plane that (i) is parallel to the rotational axis of the feeding portion and (ii) passes through the discharge passageway; and a shutter provided with a shutter opening configured to permit discharge of the developer from the discharge passageway, the shutter being supported by the developer discharging portion so as to be slidable between an open position in which the shutter opening and one end of the discharge passageway are in fluid communication with each other and a closed position in which the end of the discharge passageway is closed by the shutter, the shutter including a recessed portion on an outer side of the shutter, wherein, when the developer supply container is oriented with the one end of the discharge passageway positioned at a bottom side of the developer discharging portion, (i) the track and the shutter are positioned below a horizontal plane that includes the rotational axis, and (ii) the recessed portion includes an inclined surface that is inclined relative to a horizontal plane, with the inclined surface surrounding the shutter opening and being inclined such that on a second plane that is normal to the rotational axis and passes through the discharge passageway and the shutter opening, the inclined surface is closer to the track on the one side than a part of the developer discharging portion that corresponds to the track on the other side of the developer discharging portion in a state that the shutter opening and one end of the discharge passageway are in fluid communication with each other.

2. A developer supply container according to claim 1, further comprising a developer accommodating portion that is (i) configured to contain the developer, (ii) configured to be rotatable relative to the developer discharge portion, and (iii) that is integrally provided with a helical feeding portion provided on an inner surface thereof as the feeding portion.

3. A developer supply container comprising:

a developer accommodating portion accommodating developer;

a developer discharging portion in fluid communication with the developer accommodating portion, the developer accommodating portion being rotatable about a rotational axis and relative to the developer discharging portion, the developer discharging portion including a discharge passageway extending to outside of the developer supply container, with the discharge passageway being configured to discharge the developer;

a track provided outside of the developer discharging portion at one side thereof with respect to a first plane that (i) is parallel to the rotational axis and (ii) passes through the discharge passageway; and a shutter provided with a shutter opening configured to permit discharge of the developer from the discharge passageway, the shutter being supported by the developer discharging portion so as to be slidable in a direction of the rotational axis between an open position in which the shutter opening and one end of the discharge passageway are in fluid communication with each other and a closed position in which the one end of the discharge passageway is closed by the shutter, the shutter including a recessed portion on an outer side of the shutter, wherein, when the developer supply container is oriented with the one end of the discharge passageway positioned at a bottom side of the developer discharging portion, (i) the track and the shutter are positioned below a horizontal plane that includes the rotational axis, and (ii) the recessed portion includes an inclined surface that is inclined relative to a horizontal plane, with the inclined surface surrounding the shutter opening and being inclined such that on a second plane that is normal to the rotational axis and passes through the discharge passageway and the shutter opening, the inclined surface is closer to the track on the one side than a part of the developer discharging portion that corresponds to the track than on the other side of the developer discharging portion in a state that the shutter opening and one end of the discharge passageway are in fluid communication with each other.

4. A developer supply container according to claim 3, wherein the developer accommodating portion is integrally provided with a helical feeding portion on an inner surface thereof, the helical feeding portion being configured to feed the developer toward the developer discharging portion.

* * * * *